United States Patent
Cox, Jr. et al.

(10) Patent No.: US 11,853,445 B2
(45) Date of Patent: *Dec. 26, 2023

(54) ENHANCED SECURING AND SECURED PROCESSING OF DATA AT REST

(71) Applicant: Q-Net Security, Inc., St. Louis, MO (US)

(72) Inventors: Jerome R. Cox, Jr., St. Louis, MO (US); Ronald S. Indeck, St. Louis, MO (US); William Berndt Parkinson, Glencoe, IL (US)

(73) Assignee: Q-Net Security, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,971

(22) Filed: Jan. 4, 2022

(65) Prior Publication Data

US 2022/0237311 A1   Jul. 28, 2022

Related U.S. Application Data

(63) Continuation of application No. 17/248,080, filed on Jan. 7, 2021, now Pat. No. 11,216,575, which is a (Continued)

(51) Int. Cl.
*G06F 21/62* (2013.01)
*H04L 9/08* (2006.01)
(Continued)

(52) U.S. Cl.
CPC ........ *G06F 21/6218* (2013.01); *G06F 21/602* (2013.01); *H04L 9/0861* (2013.01); *H04L 9/14* (2013.01)

(58) Field of Classification Search
CPC ....... H04L 9/0861; H04L 9/14; G06F 21/602; G06F 21/6218
See application file for complete search history.

(56) References Cited

U.S. PATENT DOCUMENTS

| 4,408,203 A | 10/1983 | Campbell |
| 5,237,611 A * | 8/1993 | Rasmussen ........... H04L 9/0838 380/30 |

(Continued)

OTHER PUBLICATIONS

Waage, Tim, Daniel Homann, and Lena Wiese. "Practical Application of Order-preserving Encryption in Wide Column Stores." SECRYPT. 2016 (Year: 2016).*

(Continued)

*Primary Examiner* — Syed A Zaidi
(74) *Attorney, Agent, or Firm* — THE LAW OFFICE OF KIRK D. WILLIAMS

(57) ABSTRACT

In one embodiment, data at rest is securely stored. A data safe performing data plane processing operations in response to requests of received read data requests, received write data requests, and received read information responses, with the data safe being immutable to processing-related modifications resulting from said performing data plane processing operations. Performing these data plane processing operations does not expose any pilot keys outside the data safe in plaintext form nor in encrypted form. The pilot keys are used to encrypt information that is subsequently stored in a storage system. In one embodiment, the information encrypted and decrypted by the data safe includes data structure instances including feature-preserving encrypted entries generated using feature-preserving encryption on corresponding plaintext data items. In one embodiment, a data vault performs queries on the data structure instances including feature-preserving encrypted entries after retrieval from storage and decryption by the data safe.

18 Claims, 14 Drawing Sheets

Related U.S. Application Data continuation-in-part of application No. 16/736,747, filed on Jan. 7, 2020, now Pat. No. 11,017,110, which is a continuation of application No. 16/154,987, filed on Oct. 9, 2018, now Pat. No. 10,528,754.

(51) Int. Cl.
*H04L 9/14* (2006.01)
*G06F 21/60* (2013.01)

(56) References Cited

U.S. PATENT DOCUMENTS

| | | | |
|---|---|---|---|
| 5,442,708 A * | 8/1995 | Adams, Jr. | H04L 63/0428 713/153 |
| 6,345,101 B1 | 2/2002 | Shukla | |
| 7,225,333 B2 | 5/2007 | Peinado et al. | |
| 7,496,196 B2 * | 2/2009 | Jalfon | H04L 9/0631 380/37 |
| 7,826,614 B1 * | 11/2010 | Kaniz | H04L 9/0643 713/153 |
| 8,108,668 B2 | 1/2012 | Roza | |
| 8,423,789 B1 | 4/2013 | Poo et al. | |
| 8,522,041 B2 * | 8/2013 | Hsu | G06F 21/72 713/189 |
| 8,621,202 B2 | 12/2013 | Mukherjee | |
| 8,639,947 B2 | 1/2014 | Elovici et al. | |
| 8,650,657 B1 | 2/2014 | Shankar et al. | |
| 8,879,727 B2 * | 11/2014 | Taylor | H04L 9/0618 380/42 |
| 9,444,793 B2 | 9/2016 | Matzkel et al. | |
| 9,596,081 B1 * | 3/2017 | Boldyreva | H04L 9/0618 |
| 9,614,669 B1 * | 4/2017 | Cox, Jr. | H04L 63/0435 |
| 9,904,788 B2 | 2/2018 | Kumar et al. | |
| 10,021,078 B2 | 7/2018 | Matzkel et al. | |
| 10,097,522 B2 | 10/2018 | Philipp | |
| 10,528,754 B1 | 1/2020 | Cox, Jr. et al. | |
| 11,017,110 B1 | 5/2021 | Cox, Jr. et al. | |
| 11,216,575 B2 | 1/2022 | Cox, Jr. et al. | |
| 2003/0046568 A1 | 3/2003 | Riddick et al. | |
| 2004/0148356 A1 | 7/2004 | Bishop, Jr. | |
| 2005/0010790 A1 | 1/2005 | Lang et al. | |
| 2005/0039031 A1 | 2/2005 | Mont et al. | |
| 2005/0144468 A1 | 6/2005 | Northcutt et al. | |
| 2005/0154896 A1 | 7/2005 | Widman et al. | |
| 2005/0160053 A1 | 7/2005 | Okamoto et al. | |
| 2005/0177741 A1 | 8/2005 | Chen et al. | |
| 2005/0177749 A1 | 8/2005 | Ovadia | |
| 2005/0207578 A1 | 9/2005 | Matsuyama et al. | |
| 2006/0059372 A1 * | 3/2006 | Fayar | G06F 21/72 713/192 |
| 2006/0262928 A1 | 11/2006 | Bar-El et al. | |
| 2007/0113073 A1 | 5/2007 | Maillard et al. | |
| 2007/0180266 A1 | 8/2007 | Kang et al. | |
| 2007/0237325 A1 | 10/2007 | Gershowitz et al. | |
| 2008/0046581 A1 | 2/2008 | Molina et al. | |
| 2008/0133935 A1 | 6/2008 | Elovici et al. | |
| 2009/0063846 A1 | 3/2009 | Baker et al. | |
| 2009/0282261 A1 | 11/2009 | Khan et al. | |
| 2009/0282263 A1 | 11/2009 | Khan et al. | |
| 2010/0146299 A1 * | 6/2010 | Swaminathan | G06F 21/6227 707/E17.014 |
| 2010/0313011 A1 | 12/2010 | Laffey | |
| 2011/0167278 A1 | 7/2011 | Goto et al. | |
| 2012/0060039 A1 | 3/2012 | Leclercq | |
| 2014/0019770 A1 | 1/2014 | Jung et al. | |
| 2014/0105399 A1 | 4/2014 | Lin | |
| 2014/0201540 A1 | 7/2014 | Li et al. | |
| 2014/0281511 A1 * | 9/2014 | Kaushik | H04L 63/062 713/164 |
| 2015/0146872 A1 | 5/2015 | Baek et al. | |
| 2016/0154963 A1 | 6/2016 | Kumar et al. | |
| 2017/0103220 A1 | 4/2017 | Tredoux et al. | |
| 2017/0272944 A1 | 9/2017 | Link, II | |
| 2018/0260876 A1 | 9/2018 | Graham et al. | |

OTHER PUBLICATIONS

NPL Search Terms (Year: 2023).*
Schaad and Housley, "Advanced Encryption Standard (AES) Key Wrap Algorithm," RFC 3394, Sep. 2002, The Internet Society, Reston, VA, USA (forty-one pages).
Douglas R. Stinson, Chapter 3: Block Ciphers and the Advanced Encryption Standard, Cryptography Theory and Practice, 2006, Chapman & Hall/CRC, Boca Raton, FL, pp. 73-113.
Douglas R. Stinson, Chapter 4: Cryptographic Hash Functions, Cryptography Theory and Practice, 2006, Chapman & Hall/CRC, Boca Raton, FL, pp. 119-155.
Douglas R. Stinson, Chapter 5, The RSA Cryptosystem and Factoring Integers, Cryptography Theory and Practice, 2006, Chapman & Hall/CRC, Boca Raton, FL, pp. 161-226.
David Friedman and David Nagle, "Building Firewalls with Intelligent Network Interface Cards," May 2001, School of Computer Science, Carnegie Mellon University, Pittsburgh, PA (twenty-one pages).
Acar et al., "Cryptographically Verified Design and Implementation of a Distributed Key Manager," 2011, Microsoft Corporation, Redmond, WA (eighteen pages).
"Advanced Encryption Standard (AES)," Nov. 2001, National Institute of Standards and Technology, U.S. Department of Commerce, Gaithersburg, MD (fifty-one pages).
"Momentus 5400 FDE.2 Hard Drive and DriveTrust: Best-in-Class Data Protection for Laptops," 2007, Seagate Technology LLC, Scotts Valley, CA (five pages).
"Momentus 7200 FDE.2 SATA," Sep. 2009, Product Manual Rev. B, Seagate Technology LLC, Scotts Valley, CA (sixty pages).
"FIPS 140-2 Level 2 Security Policy for FlagStone Core," Jun. 14, 2011, Issue 1.7, Stonewood Group, Aldershot, England, UK (fifty pages).
"Eclypt Core Datasheet," 2017, Viasat, Inc., San Diego, CA (two pages).
"Order-preserving encryption," retrieved Jan. 5, 2021, from http://cryptowiki.net/index.php?title=Order-preserving_encryption (nine pages).
Xiao, Liangliang & Yen, I-Ling & Lin, Dongdai, "Security Analysis for an Order Preserving Encryption Scheme," Mar. 2012, 10.1109/CISS.2012.6310814 (six pages).
F. Kerschbaum and A. Schröpfer, "Optimal Average-Complexity Ideal-Security Order-Preserving Encryption," CCS '14: Proceedings of the 2014 ACM SIGSAC Conference on Computer and Communications Security, Nov. 2014 pp. 275-286.
V. Kolesnikov and A. Shikfa, "On the limits of privacy provided by order-preserving encryption," in Bell Labs Technical Journal, vol. 17, No. 3, pp. 135-146, Dec. 2012, doi: 10.1002/bltj.21564.
Boldyreva et al., "Order-Preserving Encryption Revisited: Improved Security Analysis and Alternative Solutions," Advances in Cryptology—Crypto 2011 Proceedings, Lecture Notes in Computer Science, Ph. Rogaway ed., 2011, College of Computing, Georgia Institute of Technology, Atlanta, GA (thirty-six pages).
Mavroforakis et al., "Modular Order-Preserving Encryption, Revisited," SIGMOD'15, May 31-Jun. 4, 2015, Melbourne, Victoria, Australia (fourteen pages).
Boneh et al., "Semantically Secure Order-Revealing Encryption: Multi-Input Functional Encryption Without Obfuscation," In proceedings of Eurocrypt 2015, LNCS 9057, pp. 563-594.
K. Lewi and D. Wu, "Order-Revealing Encryption: New Constructions, Applications, and Lower Bounds," ACM Conference on Computer and Communications Security in Oct. 2016 (forty-four pages).
Grubbs et al., "Leakage-Abuse Attacks against Order-Revealing Encryption," 2017 IEEE Symposium on Security and Privacy, May 22-24, 2017, San Jose, CA (eighteen pages).
Chenette et al., "Practical Order-Revealing Encryption with Limited Leakage," In: Peyrin T. (eds) Fast Software Encryption. FSE 2016. Lecture Notes in Computer Science, vol. 9783. Springer, Berlin, Heidelberg, pp. 474-493.

(56) References Cited

OTHER PUBLICATIONS

Bogatov et al., "A Comparative Evaluation of Order-Revealing Encryption Schemes and Secure Range Query Protocols," Proceedings of the VLDB Endowment, vol. 12, No. 8, Apr. 2019 (fifteen pages).

Boris Rozenberg, "Analysis of the State of the Art of FPE, OPE, And Tokenization Schemes," Deliverable D4.9, Mar. 2017, PRISMACLOUD Consortium, Vienna, Austria (seventeen pages).

A. Francillon and C. Castelluccia, "Code injection attacks on harvard-architecture devices," CCS '08: Proceedings of the 15th ACM conference on Computer and communications security, Oct. 2008, Alexandria, Virginia, United States. pp. 15-26.

"Homomorphic Encryption Standard," Version 1.1, Nov. 21, 2018, Homomorphic Encryption Standardization Consortium, available at http://homomorphicencryption.org/wp-content/uploads/2018/11/HomomorphicEncryptionStandardv1.1.pdf (thirty-three pages).

* cited by examiner

ENHANCED SECURING AND SECURED PROCESSING OF DATA AT REST

CROSS-REFERENCE TO RELATED APPLICATIONS

This application is a continuation of U.S. patent application Ser. No. 17/248,080, filed on Jan. 7, 2021, which is a continuation-in-part of U.S. patent application Ser. No. 16/736,747, filed on Jan. 7, 2020, now U.S. Pat. No. 11,017,110, which is a continuation of U.S. patent application Ser. No. 16/154,987, filed Oct. 9, 2018, now U.S. Pat. No. 10,528,754; with all of these applications being hereby incorporated by reference in their entirety.

TECHNICAL FIELD

The present disclosure relates generally to enhanced securing and secured processing of data at rest, including, but not limited to, hardware-based security performing cybersecurity functions.

BACKGROUND

Current solutions to the management of security risks on the Worldwide Web/Public Internet have proven to be inadequate. Recent scenarios and breaches have projected economic losses of hundreds of millions of dollars and caused the disclosure of private information essential to many corporations and millions of individuals.

For example, on 8 Jul. 2015, the University of Cambridge Centre for Risk Studies and the Lloyd's of London insurance market outlined an electricity-blackout scenario that would leave 93 million people in New York City and Washington DC without power. A likely version of the scenario estimates the impact on the U.S. economy to be $243 billion. However, the most extreme version of the attack could shut down parts of the United States power grid for almost a month and raise long-term legal and environmental issues that could cost as much as $1 trillion to the U.S. economy over a five year time span. These estimates are more than mere speculation because there have been, according to the report, at least 15 suspected cyber-attacks on the U.S. electricity grid since 2000.

A day later, on 9 Jul. 2015, the U.S. Office of Personnel Administration announced that 21.5 million people were swept up in a colossal breach of government computer systems that resulted in the theft of a vast trove of personal information, including Social Security numbers and some fingerprints.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
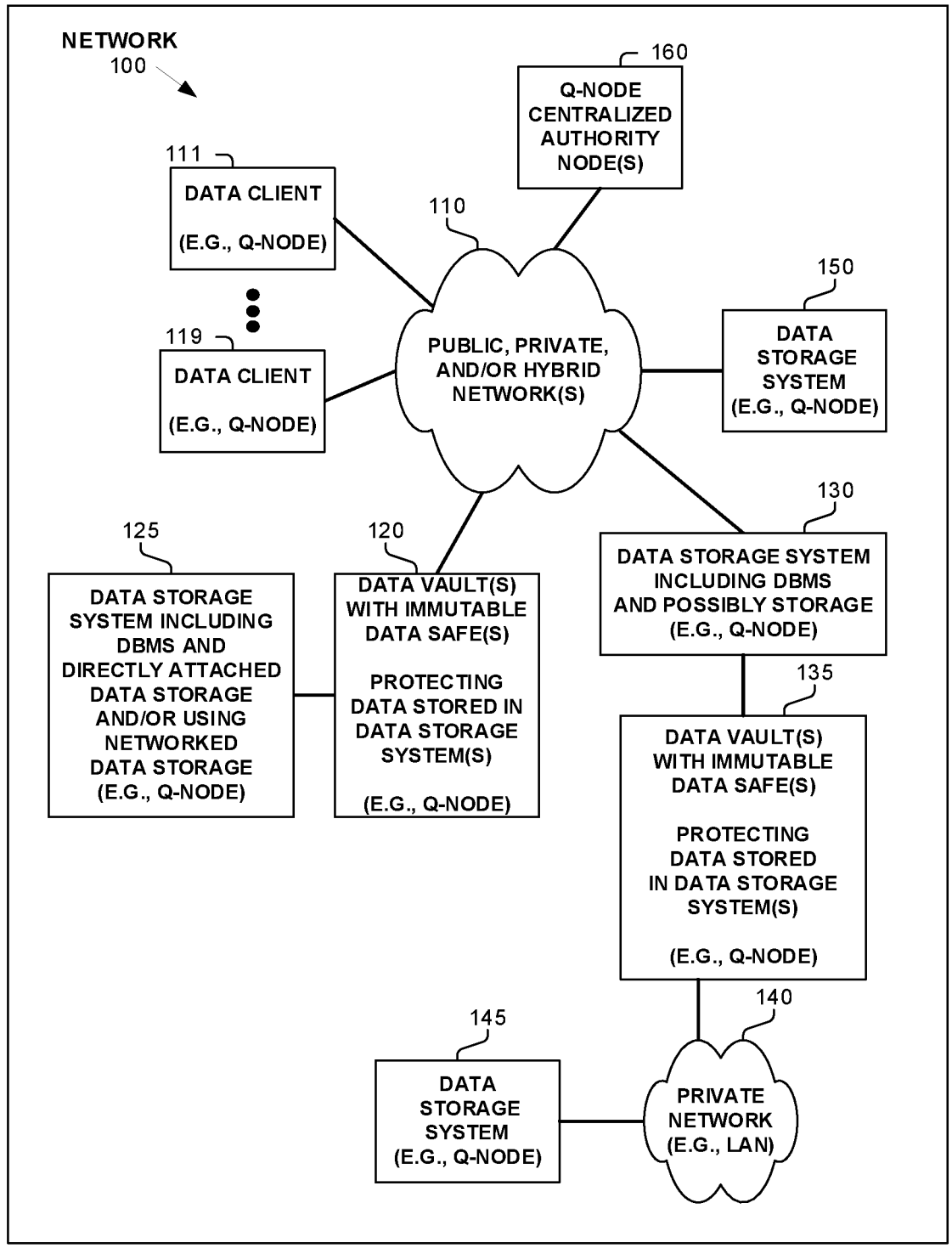
FIG. 1A illustrates a network operating according to one embodiment.

Disclosed are, inter alia, methods, apparatus, computer-storage media, mechanisms, and means associated with enhanced securing of data at rest using an immutable "data safe" to protect information stored in an external storage system. The data safe encrypts information subsequently stored in the storage system and decrypts encrypted information retrieved from the storage system, without exposing outside of the data safe cryptographic "pilot keys" maintained in non-volatile storage within the data safe. Each of these pilot keys is typically used for decrypting a small amount of encrypted information, such that any computational discovery of a pilot key will only allow a small amount of information to be decrypted. In one embodiment, this information includes data item(s) and/or data structure(s). Further, by implementing the data safe in a manner that is immutable to processing-related modifications, the data safe cannot be "hacked" to expose any of these pilot keys nor perform unauthorized decryption of information that requires one or more of the pilot keys maintained internal to the data safe.

In one embodiment, these pilot keys are directly used in encrypting information and decrypting encrypted information. In one embodiment, these pilot keys are used in encrypting data cryptographic keys and decrypting the cryptographically-wrapped data cryptographic keys, with the data cryptographic keys used in encrypting information and decrypting encrypted information. In one embodiment, the cryptographically-wrapped data cryptographic key and encrypted information are stored in the storage system. Subsequently and after retrieval from the storage system, the cryptographically-wrapped data cryptographic key is decrypted by the data safe based on the corresponding pilot key stored therein; and then the retrieved encrypted information is decrypted based on the decrypted data cryptographic key.

In one embodiment, these pilot keys are used in encrypting information that already includes encrypted data resulting in encrypted information that includes doubly-encrypted data. In one embodiment, the data safe uses particular pilot key(s) in encrypting a particular data structure instance having feature-preserving encrypted entries generated using feature-preserving encryption on corresponding plaintext data items. The encrypted particular data structure is stored in the storage system. After retrieval from the storage system (e.g., in response to a client query or update request), the encrypted particular data structure instance is decrypted by the data safe using the particular pilot key(s) revealing the particular data structure instance having the feature-preserving encrypted entries. Certain classes of queries are then performed on the particular data structure instance without decrypting its feature-preserving encrypted entries. In one embodiment, a data vault or data safe includes a database management system or other process that maintains and performs operations on the particular data structure instance having the feature-preserving encrypted entries, thus providing additional security as the particular data structure instance having the feature-preserving encrypted entries is not exposed to certain clients.

2. Description

Disclosed are, inter alia, methods, apparatus, computer-storage media, mechanisms, and means associated with enhanced securing of data at rest, such as stored in a database. As used herein, each of the terms "data" and "information" refers to one or more items, with these two terms being used interchangeably. As used herein, a "database" refers to an organized collection of data, stored and accessed electronically, which includes, but is not limited to, buckets, tables, relational databases, non-relational databases, object databases, sequential databases, and filesystems.

As used herein, a "database management system (DBMS)" refers to an entity that provides an interface to a database. In one embodiment, a DBMS includes, but is not limited to, a relational DBMS, an email system, a special-purpose system, a general purpose system, and/or a filesystem handler. In one embodiment, the DBMS maintains (e.g., creates, modifies, deletes) and processes (e.g., performs queries thereon) data structure instances including feature-preserving encrypted data generated using feature-preserving encryption. In one embodiment, the DBMS is implemented in a manner that is immutable to processing-related modifications. In one embodiment, the DBMS is implemented on a Harvard architecture machine. In one embodiment, the DBMS is implemented in a data vault.

As used herein, a "storage system" or "data storage" refers to a directly coupled (e.g., disk, flash memory) or networked storage (e.g., cloud storage, network disks or fileservers), that could be standalone or part of another system (e.g., computer, mobile device, smartphone, disk, solid state device). As used herein "data storage locator information" refers to an identification retrieval or storage information (e.g., real or virtual address, database identification, table, record, and/or hash of location information) where the data is to be read or written. As used herein, "data plane processing" refers to the processing of database requests, while "control plane processing" refers to configuration and other management processing. As used herein, the terms "cryptographically-wrapped" and "wrapped" are used interchangeably, with both meaning cryptographically-wrapped.

As used herein, "feature-preserving encryption" refers to a technique that generates feature-preserving encrypted data having one or more characteristics of the corresponding plaintext data items, especially a characteristic/feature associated with performing certain queries thereon without having to decrypt these feature-preserving encrypted entries. In one embodiment, the feature-preserving encryption scheme generates feature-preserving encrypted data stored in entries of a data structure instance. In one embodiment, the feature-preserving encryption scheme also generates indicia of the organizational scheme (e.g., indexes, pointers, column and row information, graph and tree nodes, links, etc.) of the data structure instance. In one embodiment, the feature-preserving encryption scheme uses one or more data structures (e.g., tree-based data structures, including self-balancing B-trees) that facilitate the rapid retrieval of related numerical data.

Feature-preserving encryption used in one embodiment includes one or more corresponding schemes known to one skilled in the art, such as, but not limited to, order-preserving encryption (OPE), order-revealing encryption (ORE), fully-homomorphic encryption (FHE), and/or format-preserving encryption (FPE).

Order-preserving encryption is a encryption scheme that generates feature-preserving encrypted data items having the same numerical ordering as their source plaintext data items. Comparison-based queries (e.g., equality, ranges, maximum, minimum, count), group operations, and ordering operations are performed on the feature-preserving encrypted data (e.g., without decryption) based on encryptions of the plaintext operands of the queries. However, operations such as summation, average, or retrieval of the plaintext data items require decryption of the corresponding feature-preserving encrypted data items. Fully-homomorphic encryption allows analytical functions to be processed directly on the feature-preserving encrypted data.

Data protected using a feature-preserving encryption scheme is subject to encryption attacks, especially when leakage information of the plaintext data items can be acquired from queries performed on the feature-preserving encrypted entries in the data structure instance.

One embodiment reduces this security issue by using a data safe that provides additional one or more encryption layers of protection on the feature-preserving encrypted data entries and/or indicia of the organizational scheme of the data structure instance. One embodiment further reduces this security issue by maintaining and performing operations on the data structure instance and its feature-preserving encrypted data entries, while not revealing to certain clients the data structure instance and its feature-preserving encrypted data entries.

In one embodiment, pilot keys are used in encrypting information that already includes encrypted data resulting in encrypted information that includes doubly-encrypted data. In one embodiment, the data safe uses particular pilot key(s) in encrypting a particular data structure instance having feature-preserving encrypted entries generated using feature-preserving encryption on corresponding plaintext data items. The encrypted particular data structure is stored in the storage system (e.g., by a DBMS). After retrieval from the storage system (e.g., in response to a query or update request), the encrypted particular data structure instance is decrypted by the data safe using the particular pilot key(s) revealing the particular data structure instance having the feature-preserving encrypted entries. Certain classes of queries are then performed on the particular data structure instance without decrypting its feature-preserving encrypted entries. In one embodiment, a data vault or data safe includes a database management system or other process that maintains and performs operations on the particular data structure instance having the feature-preserving encrypted entries, thus providing additional security as the particular data structure (including its feature-preserving encrypted entries) is not exposed to certain clients.

In one embodiment, a data safe uses one or more pilot keys in encrypting and decrypting each data structure instance and its feature-preserving encrypted data that was produced using feature-preserving encryption. In one embodiment, a data safe uses one or more pilot keys in encrypting and decrypting the feature-preserving encrypted data. In one embodiment, a data safe uses one or more pilot keys in encrypting and decrypting the feature-preserving encrypted data (e.g., stored in entries or leaf nodes) of each data structure instance. In one embodiment, a single pilot key is used in encrypting and decrypting an entire data structure instance and/or the feature-preserving encrypted data entries of the data structure instance. Each different data structure instance is independently assigned pilot key(s) by the data safe; thus, the data safe uses different pilot key(s) in encrypting and decrypting each data structure instance and/or the feature-preserving encrypted data entries of the data structure instance (e.g., unless occurrence in one embodiment of the probabilistic, almost impossible event of the cryptographic key generating circuitry of the data safe generating two identical pilot keys).

One embodiment uses pilot keys directly in performing the encryption and decryption associated with each instance. One embodiment uses pilot keys in encrypting data cryptographic keys and decrypting the cryptographically-wrapped data cryptographic keys, with the data cryptographic keys used by the data safe in performing encryption and decryption associated with each instance. In one embodiment, the cryptographically-wrapped data cryptographic key and encrypted information associated with each instance are stored in the storage system.

In one embodiment, the data safe use pilot keys directly in performing the encryption and decryption of the data structure instances having feature-preserving encrypted data entries; thus, providing improved processing efficiencies and reducing storage requirements as there are no cryptographically-wrapped data cryptographic keys to be generated and stored in the storage system. Additional improved processing efficiencies are provided as the corresponding decryption operation performed by the data safe on the retrieved encrypted data structure instance having feature-preserving encrypted data entries does not require reading and decrypting an associated cryptographically-wrapped data cryptographic key.

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. As used herein, the term processing in "parallel" is used in the general sense that at least a portion of two or more operations are performed overlapping in time. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Finally, the term "particular machine," when recited in a method claim for performing steps, refers to a particular machine within the 35 USC § 101 machine statutory class.

FIG. 1A illustrates a network 100 operating according to one embodiment. National intelligence-grade protection of the confidentiality and integrity of data in transit is provided by Q-net technology, including by Q-nodes disclosed in Cox, Jr. et al., U.S. Pat. No. 9,614,669 B1 issued Apr. 4, 2017, which is incorporated by reference in its entirety. Q-nodes communicate between themselves using authorized and authenticated encryption communications.

One embodiment achieves national intelligence-grade protection of data at rest in a database using immutable data safe(s). As used herein, a "data safe" refers to an entity that performs encryption and decryption of information in protecting data stored in a storage system. Cryptographic "pilot keys," maintained in non-volatile storage within the data safe, are used to decrypt encrypted information received from a storage system. Typically, these pilot keys are cryptographic symmetric, and therefore, also used in encrypting information to generated the encrypted information. The pilot keys are not exposed outside of the data safe by data plane processing of database requests, as the encryption and decryption operations are performed within the data safe. In one embodiment, the encryption and decryption performed by a data safe operate according to a version of the Advanced Encryption Standard (AES), or other encryption/decryption methodology.

In one embodiment, the pilot keys are asymmetric cryptographic keys used in the decryption of information, with corresponding asymmetric encryption keys used to encrypt the information. For ease of reader understanding, typically described herein is the use of symmetric cryptographic pilot keys for both encryption and decryption, with the understanding that of asymmetric decryption pilot keys and their corresponding asymmetric encryption keys are used in place of symmetric pilot keys in one embodiment.

In one embodiment, these pilot keys are directly used in encrypting data and decrypting encrypted data. In one embodiment, these pilot keys are used in encrypting data cryptographic keys and decrypting the cryptographically-wrapped data cryptographic keys, with the data cryptographic keys used in encrypting data and decrypting encrypted data. In one embodiment, the cryptographically-wrapped data cryptographic key and encrypted data are stored in the storage system.

One embodiment uses an individual pilot key or data cryptographic key for at most encrypting w different units of data, with w being a positive integer less than or equal to some number such as, but not limited to a number ranging from one to two hundred and fifty-five. In one embodiment, each unit of data is a database record, file, or some small data unit. In one embodiment, the allocation of pilot keys and/or data cryptographic keys is done regardless of client or user information. Rather, encrypting only small amounts of data using a same cryptographic key limits the exposure for a compromised key, and greatly increases the computing barrier that would need to be overcome for decrypting an entire stolen disk or acquired data.

As shown, FIG. 1A illustrates a public, private, and/or hybrid network 100 operating according to one embodiment. Shown are multiple data clients 111-119 (e.g., computers, mobile devices, smartphones, servers) that will access data at rest in a data storage system (125, 130, 145, 150) protected by a data safe that is part of a data vault 120, 135. As shown and in one embodiment, network(s) 110 provide communication for data clients 111-119 to access protected data stored in one or more of data storage systems 125, 145, 150. In one embodiment, a data safe in a data vault (120, 135) uses one or more particular pilot keys in encrypting and decrypting feature-preserving encrypted entries in a data structure instance generated using feature-preserving encryption on corresponding plaintext data items.

As used herein, a "data vault" is an apparatus that includes one or more data safes and provides communications and/or other functionality for the data safe to interface client(s), storage system(s), and/or other entities. Embodiments of a data safe are used to protect data at rest in an unlimited number of storage systems, some of which have different architectures and/or interfaces. Additionally, a data safe receive data requests from an unlimited number of clients, some of which may be directly or remotely connected using a variety of different interfaces. Hence, the entity of a data vault is used to describe a data safe and corresponding interface(s).

Additionally, one embodiment of a data vault includes one or more processing elements and memory used in maintaining (e.g., creating, modifying, deleting) and processing (e.g., performing queries thereon, possibly after decryption per the feature-preserving encryption scheme) data structure instances including feature-preserving encrypted data entries generated using feature-preserving encryption.

In one embodiment, a data vault is a Q-node or other node that provides secure communications and/or provides non-secure communications, other interfaces and/or functionality. In one embodiment, a data vault provides secure communications between a client and the data safe and/or communications with a storage system. In one embodiment, a data vault includes the storage system, such as, but not limited to, a disk, solid state device, RAID system, network attached storage (NAS), etc., that typically includes a database management system (DBMS) (e.g., a traditional DBMS, filesystem handler).

In one embodiment, one or more of networked devices 111-160 in network 100 are Q-nodes that communicate via secure communications via immutable hardware, including with Q-node Centralized Authority Node(s) that authorizes communications between pairs of networked devices 111-160.

In one embodiment, data vault 120 includes a data safe that protects data at rest in data storage system 125 and/or data storage system 150.

In one embodiment, the data safe of data vault 120 encrypts and decrypts data associated with data storage system 125 and/or 150 based on pilot keys that are stored in the data safe of data vault 120.

In one embodiment, the data safe of data vault 120 encrypts and decrypts information including data decrypting keys and possibly other data associated with data storage system 125 and/or 150 based on the pilot keys that are stored in the data safe of data vault 120. In one embodiment, these data decrypting keys are cryptographically-wrapped and stored along with encrypted data in data storage system 125 and/or 150.

In one embodiment, the DBMS of data storage system 125 and/or 150 retrieves, modifies and stores database records including encrypted data and/or information in the database of data storage system 125 and/or 150.

In one embodiment, data vault 135 includes a data safe that protects data at rest in data storage system 130 and/or 145 (communicatively coupled via network 140). In contrast to data vault 120, data vault 135 is positioned logically or physically between the DBMS in data storage system 130 and the physical storage in data storage system 130 and/or 145 that actually stores the encrypted data and possibly wrapped data decryption keys for non-temporary durations. In this manner and in one embodiment, the DBMS of data storage system 130 initiates retrieving, modification and storing of plaintext, non-encrypted database records, which are protected by data vault 135 with data safe.

In one embodiment, the data safe of data vault 135 and the DBMS in data storage system 130 communicate encryption and decryption requests and responses. The associated encryption and decryption operations, as discussed herein including in relation to the data safe of data vault 120, are performed by the data safe of data vault 135. The DBMS of data storage system 130 retrieves, modifies and stores database records, that include encrypted data and/or information, in the database of data storage system 150 (e.g., cloud storage, NAS).

In one embodiment, each of data vaults 120 and 135 (each including a data safe) are Q-nodes that employ secure communication (e.g., using authenticated encryption) with data clients 111-119. In one embodiment, Q-node data vaults 120 and 135 accept only trusted queries encrypted with unique keys and by employing its own hardware communications security barrier and by employing its data safe with its own encryption system for protecting data at rest. In one embodiment, hardware security barriers use immutable hardware in accomplishing cybersecurity activities including generating and distributing cryptographically-wrapped secure numbers, encryption, decryption, source authentication, and packet integrity verification.

Figure 1B:
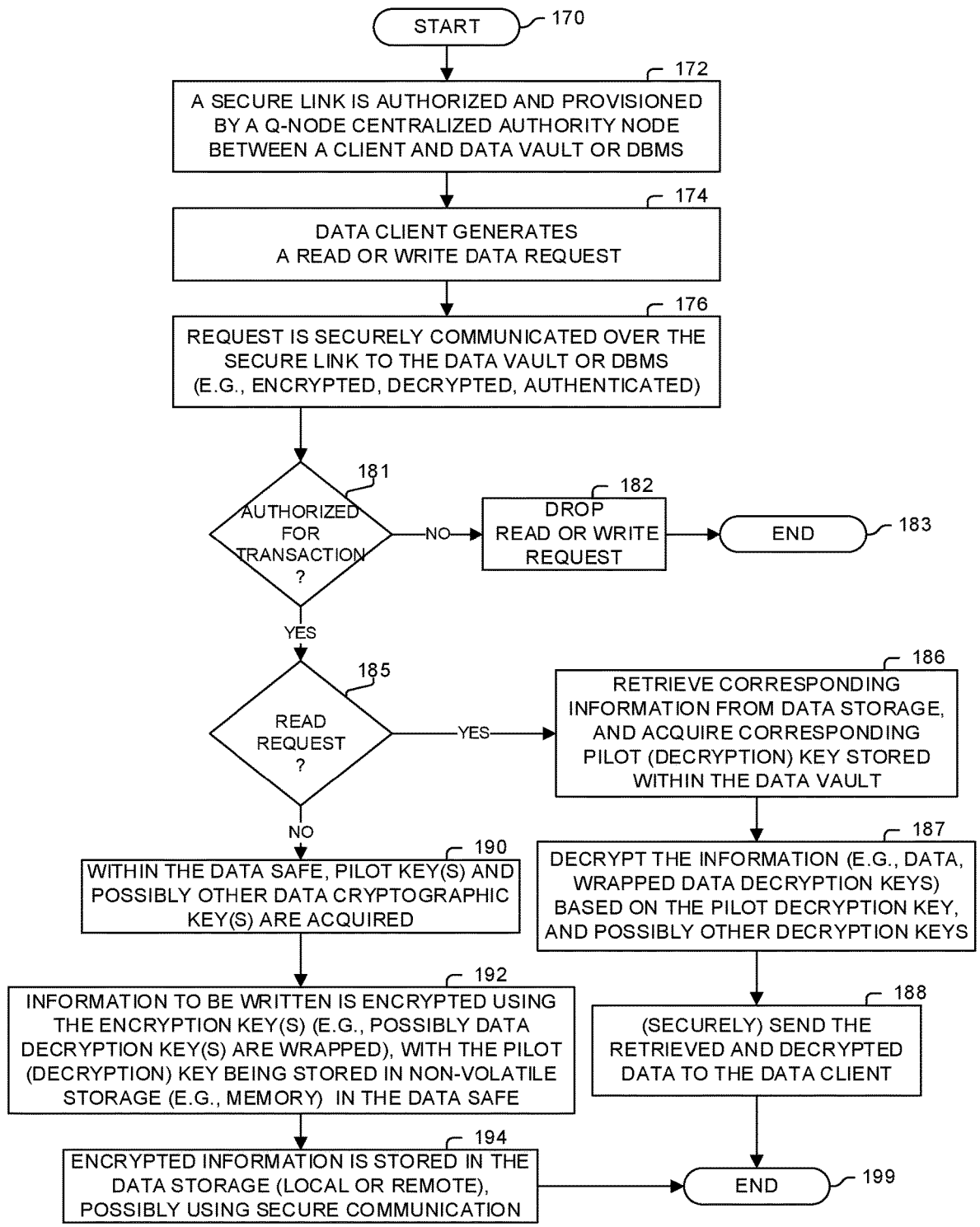
FIG. 1B illustrates a process according to one embodiment.

FIG. 1B illustrates a process performed in one embodiment. Processing begins with process block 170. In process block 172, a secure link, between a client and a data vault or DBMS is authorized and provisioned by a Q-node centralized authority node. In process block 174, the client generates a read or write request. In process block 176, the request is securely communicated over the secure link through a private, public or hybrid network to the data vault or DBMS (e.g., depending on the embodiment).

As determined in process block 181, if the request is authorized, then processing proceeds to process block 185; otherwise, processing proceeds to process block 182.

In one embodiment, the Q-nodes of a data client and a data vault use authenticated encryption communication in data request and response packets, with the communication having been authorized by a centralized authority node. In one embodiment, a data safe performs additional authorization processing such as, but not limited to, security filtering responsive to authorization information received from a centralized authority node. In one embodiment, this authorization information indicates for a particular data client that one or more particular data requests are authorized or a scope of authorization for data requests is established; otherwise, the request is dropped in process block 182. In one embodiment, determining that a received request is authorized is further based on a type of the request (i.e., a read request, write request, and/or other type of request) and/or data storage locator information associated with the request. In one embodiment, the DBMS performs file/data-access permission checking associated with the database.

Continuing to process block 182, the request is dropped as the data safe (or data vault) or the DBMS determined that it was not authorized in process block 181. Processing of the flow diagram of process block 1B is complete as indicated by process block 183.

Continuing and as determined in process block 185, if the request is a read request, then processing proceeds to process block 186; otherwise processing proceeds to process block 190 to process the write request.

Continuing with process block 190 as an authorized write request was received, pilot key(s) and data cryptographic key(s) (if to be used) are acquired, such as, but not limited to, based on a random number or other entropy generating mechanism. These pilot key(s) and any used data cryptographic key(s) will be required for decryption of the information (e.g., performed in process blocks 186 and 187 for a subsequently received, corresponding read data operation).

Continuing with process block 192, the information to be written to storage is encrypted using pilot key(s) and possibly data cryptographic key(s). In one embodiment, the resulting encrypted information includes one or more wrapped data cryptographic key(s) generated using the pilot key(s). The pilot key(s) based on which a subsequent decryption operation will be based are stored in the non-volatile storage (e.g., non-volatile memory, non-volatile registers) within the data safe at a position retrievable based on data storage locator information associated with the subsequent read request (which is typically the same data storage locator information associated with the write request). In process block 194, the encrypted information is stored in the storage system, typically in a secure manner such as, but not limited to, using secure communications using a Q-node when transported over a network that might be compromised or is not secret. Processing continues to process block 199.

Continuing with process block 186 as an authorized read request was received, corresponding information is retrieved from data storage, directly or via a DBMS, and is provided to the data safe. The data safe also acquires one or more pilot key(s) from non-volatile storage within the data safe. In process block 187, the information is decrypted based on the retrieved pilot key(s). In one embodiment, decrypting the information (e.g., data) based on the pilot key includes using the pilot key directly in decrypting the retrieved data. In one embodiment, decrypting the information (e.g., encrypted data, wrapped data cryptographic key(s)) based on the pilot key includes using the pilot key to decrypt the data cryptographic (decrypting) key(s) and then using the data cryptographic key(s) in decrypting the retrieved encrypted data. In process block 188, the retrieved and decrypted data is sent to the requesting data client, typically in a secure manner such as, but not limited to, using secure communications accusing a Q-node, especially when transporting the information over a network that might be compromised or is not secret. Processing continues to process block 199.

Continuing with process block 199, processing of the flow diagram of FIG. 1B is complete.

Thus in one embodiment consistent with the processing of the flow diagram of FIG. 1B, no pilot key (e.g., that will potentially be used for a future decrypting operation by a data safe) is exposed outside of the data safe during the data path processing of a read request nor write request.

However, in one embodiment, control plane processing allows the pilot keys to be securely communicated (e.g., using a Q-node) as part of a backup process. In one embodiment, control plane processing allows the pilot keys to be securely communicated (e.g., using a Q-node) for scalability or load balancing, so that multiple data safes, data vaults including a data safe, and/or redundant storage systems can be used for reading and decrypting the same information.

Pilot key(s) in the non-volatile storage and any wrapped data cryptographic key(s) need to be maintained as long as the corresponding encrypted information is stored in the storage system. In one embodiment, when encrypted information is permanently removed from the storage system, the corresponding pilot key(s) are removed from the non-volatile storage in the data safe.

Figure 6A:
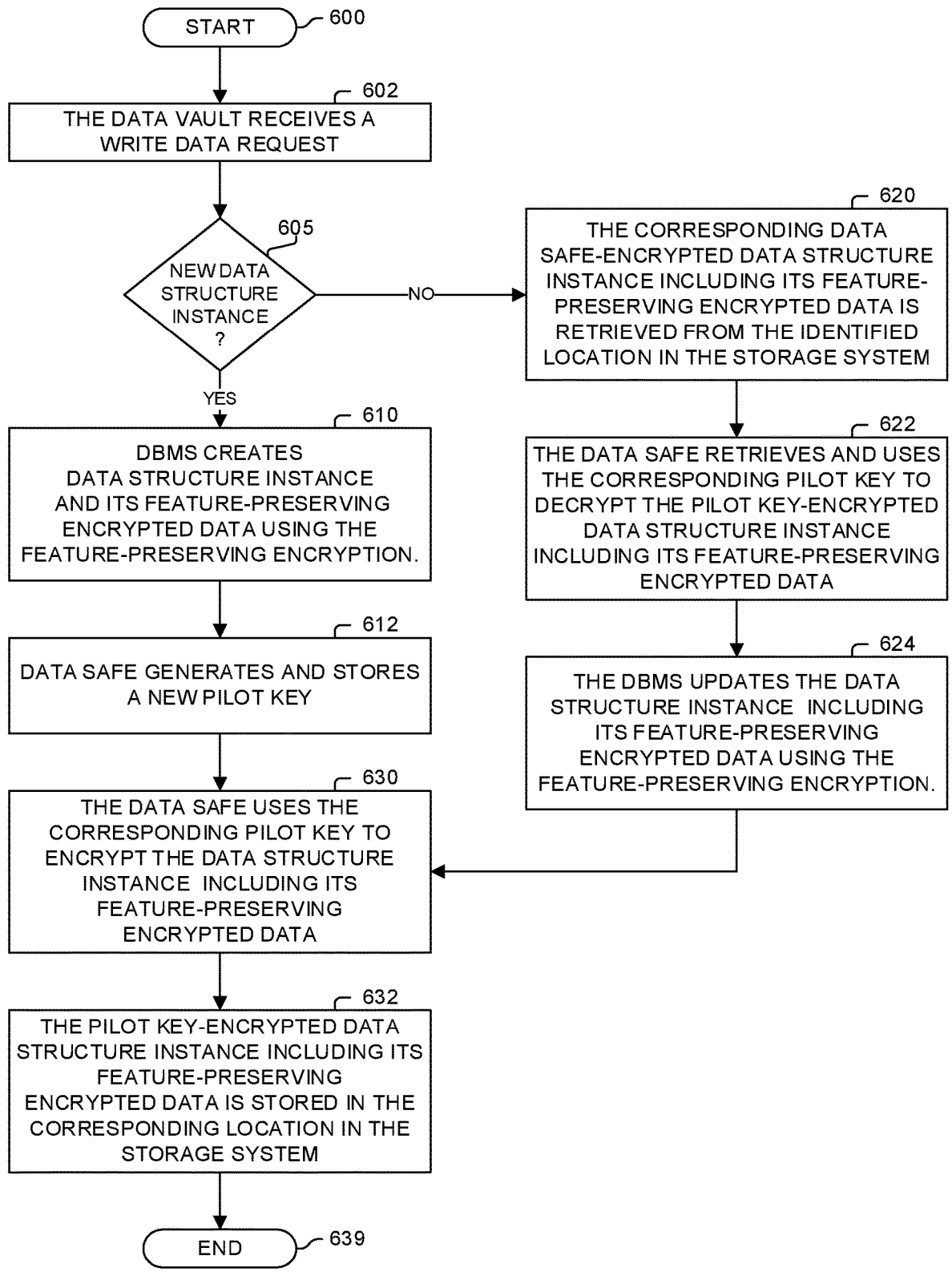
FIG. 6A illustrates a process according to one embodiment.

FIG. 6A illustrates a process, according to one embodiment, associated with enhanced securing of data at rest using an immutable data safe and its internal pilot keys to protect data structure instances having feature-preserving encrypted entries generated using feature-preserving encryption. Processing begins with processing block 600. In processing block 602, a write data request is received by the data vault.

As determined in processing block 605 by a DBMS (or other process) of the data vault based on the write data request, if a new data structure instance is to be created, then processing proceeds to processing block 610; otherwise processing proceeds to processing block 620 to update an existing data structure instance.

Continuing in processing block 610, a DBMS (or other process) of the data vault creates the new data structure instance and its feature-preserving encrypted data using the feature-preserving encryption scheme being employed. In processing block 612, a data safe of the data vault generates and stores a new pilot key in its internal storage at a location that will be identified based on subsequently processed read data requests. Processing proceeds to processing block 630.

Continuing in processing block 620, the existing data safe-encrypted data structure instance is retrieved from the corresponding location in the storage system (e.g., typically identified in processing block 605). In processing block 622, the data safe retrieves the corresponding pilot key from the corresponding location its internal storage (e.g., typically identified in processing block 605), and uses the retrieved pilot key to decrypt the pilot key-encrypted data structure instance including its feature-preserving encrypted data. In processing block 624, the DBMS (or other process) of the data vault updates the data structure instance including its feature-preserving encrypted data using the feature-preserving encryption scheme being employed. Processing proceeds to processing block 630.

Continuing in processing block 630, the data safe uses the corresponding (new or retrieved) pilot key to encrypt the data structure instance including its feature-preserving encrypted data. In processing block 632, the data safe-encrypted data structure including its feature-preserving encrypted data is stored in the corresponding location in the storage system. Processing of the flow diagram of FIG. 6A is complete as indicated by processing block 639.

Figure 6B:
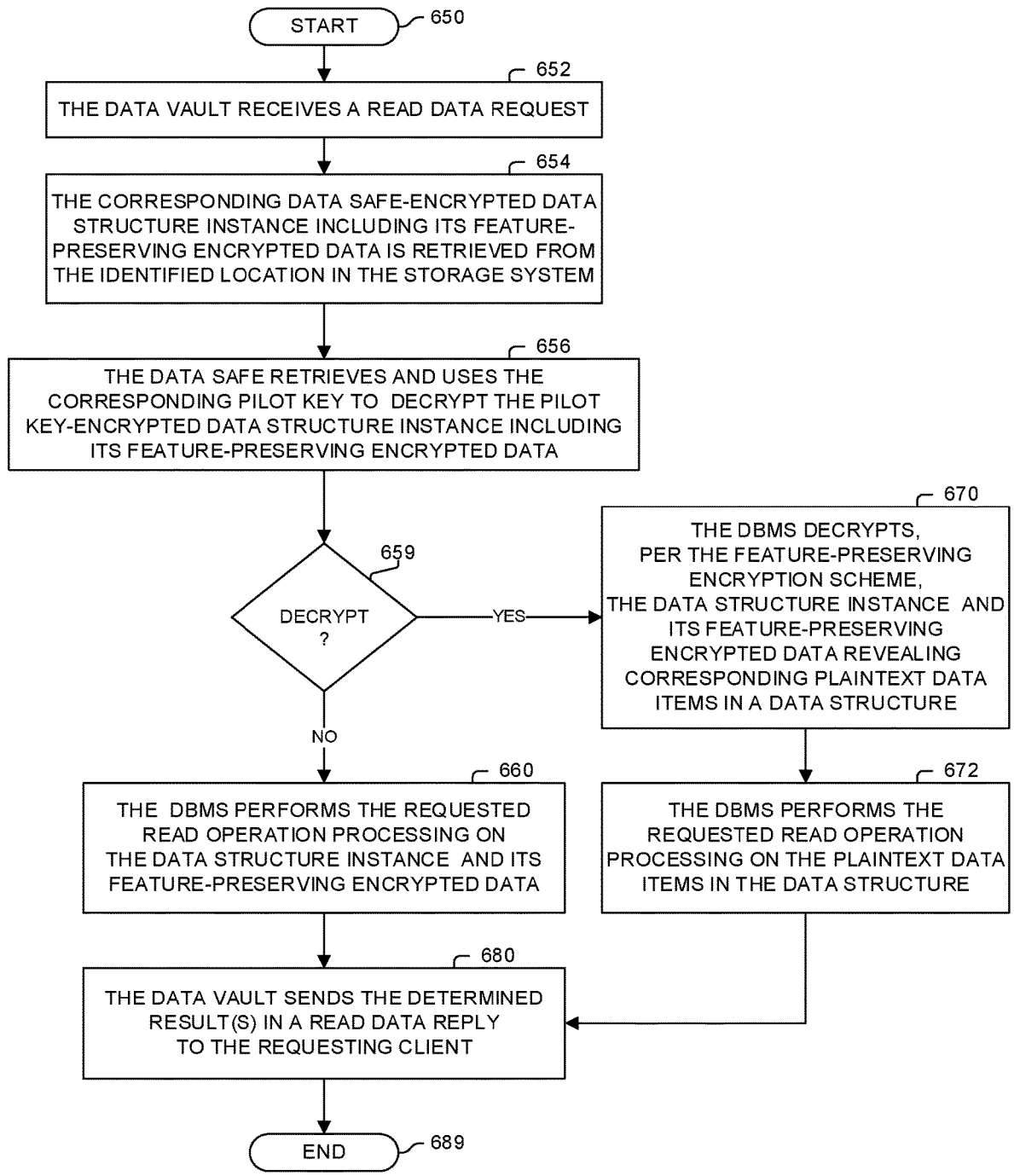
FIG. 6B illustrates a process according to one embodiment.

FIG. 6B illustrates a process, according to one embodiment, associated with enhanced securing of data at rest using an immutable data safe and its internal pilot keys to protect data structure instances having feature-preserving encrypted entries generated using feature-preserving encryption. Processing begins with processing block 650. In processing block 652, a read data request, including a query or other data base processing request, is received by the data vault. In processing block 654, the existing data safe-encrypted data structure instance (including its feature-preserving encrypted entries) is retrieved from the corresponding location in the storage system (e.g., typically identified based on the received read data request). In processing block 656, the data safe retrieves the corresponding pilot key from an identified location its internal storage (e.g., typically identified based on the received read data request), and uses the retrieved pilot key to decrypt the retrieved pilot key-encrypted data structure instance including its feature-preserving encrypted data revealing the data structure instance including its feature-preserving encrypted data.

As determined in processing block 659, if the read data request can be performed on the data structure instance including its feature-preserving encrypted data without further decryption, then processing proceeds to processing block 660; otherwise, processing proceeds to processing block 670.

Continuing in processing block 660, a DBMS (or other process) of the data vault performs the requested read operation processing (e.g., comparison, group, ordering, and/or analytical functions) based on encryptions of the plaintext operand(s) of the requested read operation processing on the data structure instance and its feature-preserving encrypted data. Processing proceeds to processing block 680.

Continuing in processing block 670, a DBMS (or other process) of the data vault decrypts, per the feature-preserving encryption scheme, the data structure instance and its feature-preserving encrypted data revealing corresponding plaintext data items in a data structure. In processing block 672, the DBMS (or other process) of the data vault performs the requested read operation processing (e.g., retrieval or manipulation operations) on the plaintext data items in the data structure. Processing proceeds to processing block 680.

Continuing in processing block 680, the data vault sends the read data result(s) (e.g., ascertained in processing block 660 or 672) in a read data response to the requesting client. Processing of the flow diagram of FIG. 6B is complete as indicated by processing block 689.

Figure 2A:
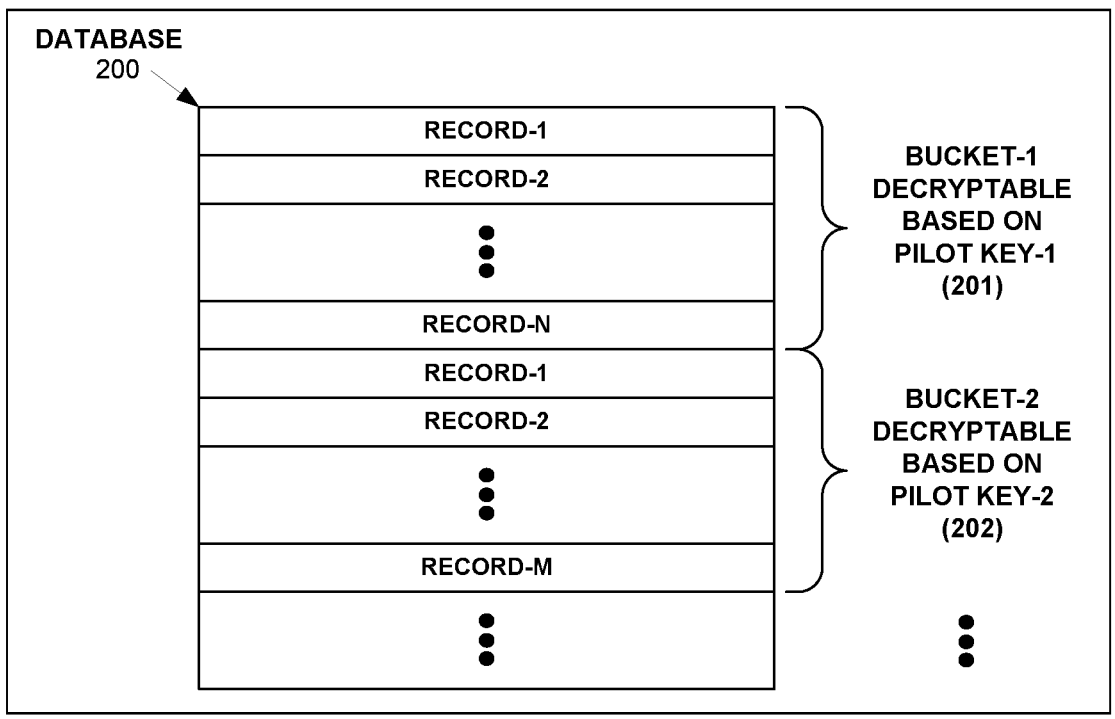
FIG. 2A illustrates data storage according to one embodiment.

FIG. 2A illustrates a database 200 used in a data storage system according to one embodiment. As shown, each record of a bucket (201, 202) of database 200 is decryptable based on a same pilot key maintained in a data safe; while records of different buckets (201, 202) of database 200 are decryptable based on different pilot keys maintained in a data safe. Depending on the one embodiment, the number of records per bucket (201, 202) of database 200 differs or is the same. In one embodiment, record(s) of a bucket (201, 202) stores feature-preserving encrypted data, natively or within a corresponding data structure instance, that has been encrypted by a data safe using a corresponding pilot key.

Figure 2B:
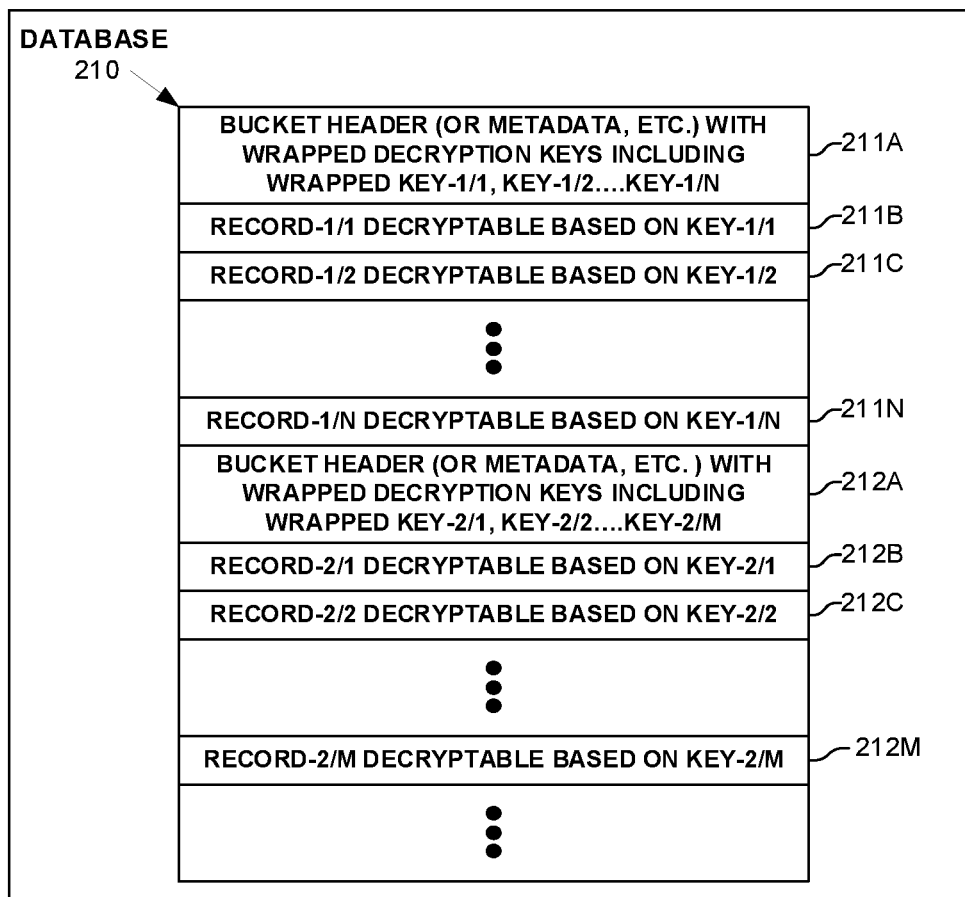
FIG. 2B illustrates data storage according to one embodiment.

FIG. 2B illustrates a database 210 used in a data storage system according to one embodiment. As shown, a header, metadata or other location (211A, 212A) associated with a corresponding data bucket (211A-N, 212A-M) is used to store wrapped data cryptographic keys. In one embodiment, data in each record (211B-N, 212B-M) is encrypted and decrypted by a data safe using a different data cryptographic key (i.e., one of the wrapped data cryptographic keys (stored in 211A, 212A) before encryption or after decryption by the data safe). In one embodiment, all wrapped data cryptographic keys stored in a header, metadata or other location (211A, 212A) associated with a corresponding data bucket (211A-N, 212A-M) are decryptable using the same pilot key; while in one embodiment, each wrapped data cryptographic key stored in a header, metadata or other location (211A, 212A) is decryptable based on a different pilot key. In one embodiment, each record (211B-N, 212B-M) stores feature-preserving encrypted data, natively or within a corresponding data structure instance, that has been encrypted by a data safe using a data cryptographic key (i.e., one of the wrapped data cryptographic keys stored in 211A, 212A).

Figure 2C:
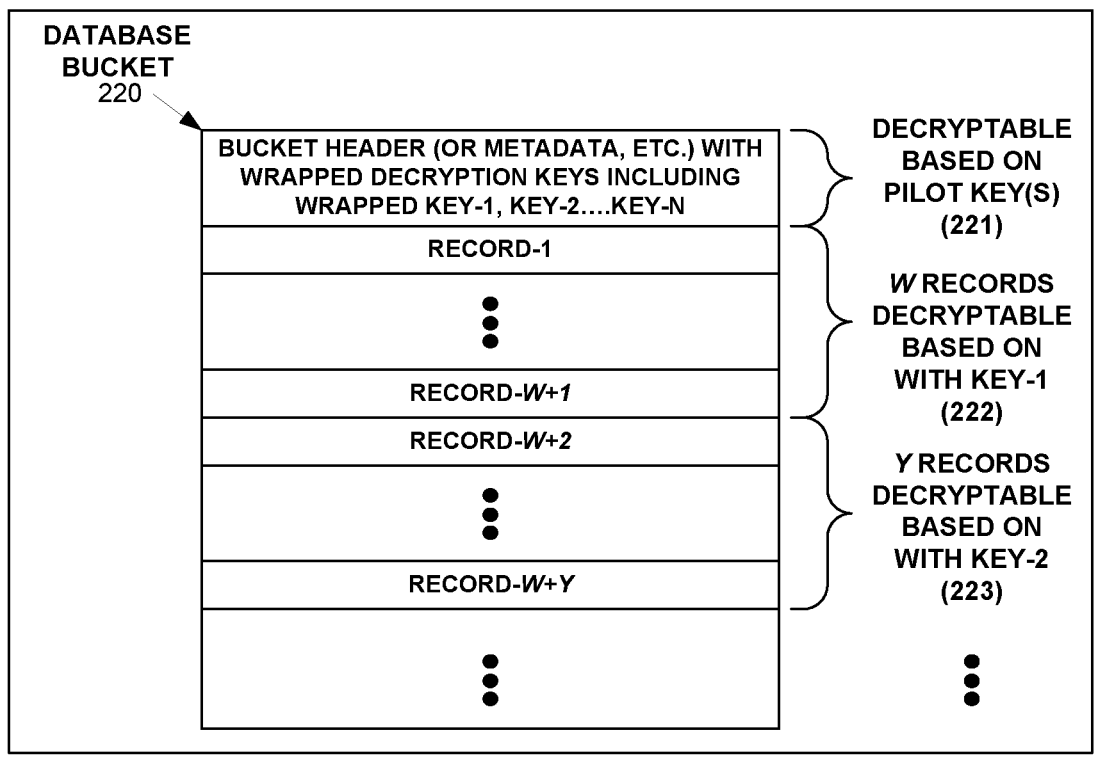
FIG. 2C illustrates data storage according to one embodiment.

FIG. 2C illustrates a database bucket 220 used in a data storage system according to one embodiment. A header, metadata or other location 221 associated with database bucket 220 stores N wrapped data cryptographic keys, each of which are decryptable by a data safe based on a corresponding pilot key maintained within the data safe. In one embodiment, all N wrapped data cryptographic keys are decryptable based on a single pilot key maintained in the data safe. In one embodiment, some or all of the N wrapped data cryptographic keys are decryptable based on a different pilot key maintained in the data safe.

FIG. 2C also illustrates that in one embodiment, a same or different number of records within database bucket 220 are decryptable based on each of the decrypted wrapped data cryptographic keys stored in database bucket 220. In one embodiment, W+1 records (222) are decryptable based on Key-1, and Y+1 records (223) are decryptable based on Key-2, with each of W and Y being a non-negative integer. In one embodiment, at least one of W and Y has a value of one, such that at least one of the data cryptographic keys is used in decrypting multiple records. In one embodiment, at least one of W and Y has a value of zero, such that at least one of the data cryptographic keys is used in decrypting only one record. In one embodiment, records within database bucket 220 store feature-preserving encrypted data, natively or within a corresponding data structure instance, that has been encrypted by a data safe using a data cryptographic key (i.e., one of the wrapped data cryptographic keys stored in header, metadata or other location 221).

Figure 2D:
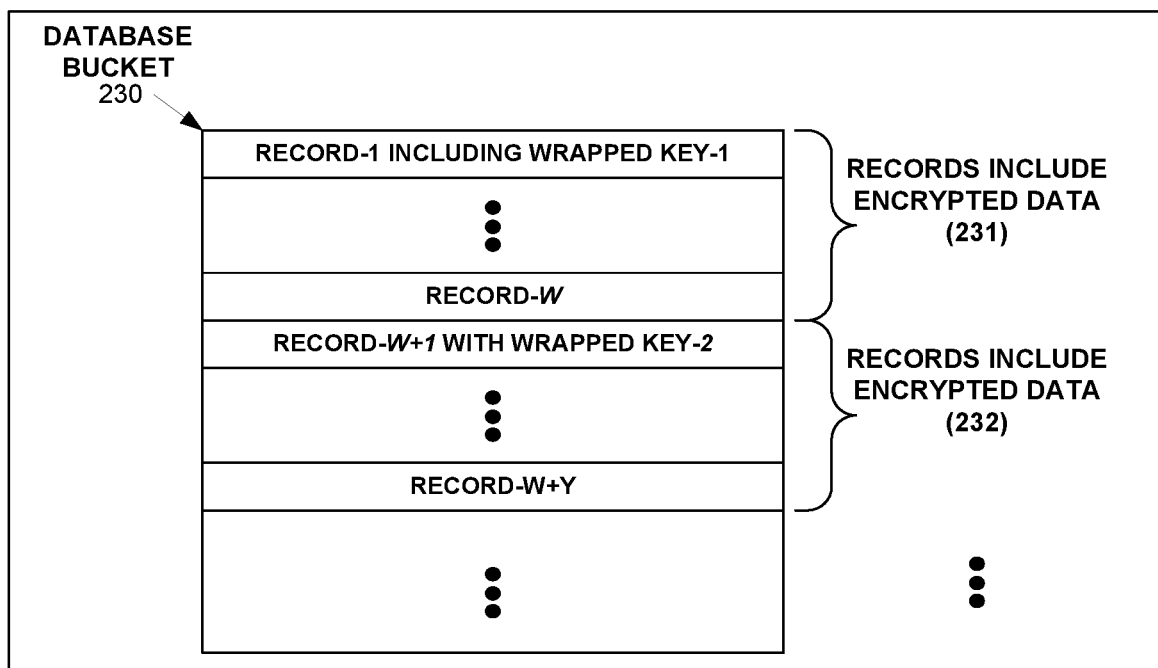
FIG. 2D illustrates data storage according to one embodiment.

FIG. 2D illustrates a database bucket 230 used in a data storage system according to one embodiment in which each wrapped data cryptographic key is stored in a record of records 231-232 of bucket 230. In one embodiment, a wrapped data cryptographic key is stored in a record (231-232) without any other encrypted data. In one embodiment, a record (231-232) stores encrypted data and the wrapped-version of the data cryptographic key that will be used by the data safe in decrypting the encrypted data. In one embodiment, a single record of records 231 contains the wrapped data cryptographic key that is will be used in the decryption of encrypted data stored in each of records 231. In one embodiment, a single record of records 232 contains the wrapped data cryptographic key that is will be used in the decryption of encrypted data stored in each of records 232. In one embodiment, this ordering allows a single read operation to read the corresponding records(s) (231, 232) containing encrypted data and corresponding wrapped data cryptographic key. In one embodiment, a record (231-232) stores feature-preserving encrypted data, natively or within a corresponding data structure instance, that has been encrypted by a data safe using a data cryptographic key (i.e., one of the wrapped data cryptographic keys stored in a same or different record 231-232).

Figure 2E:
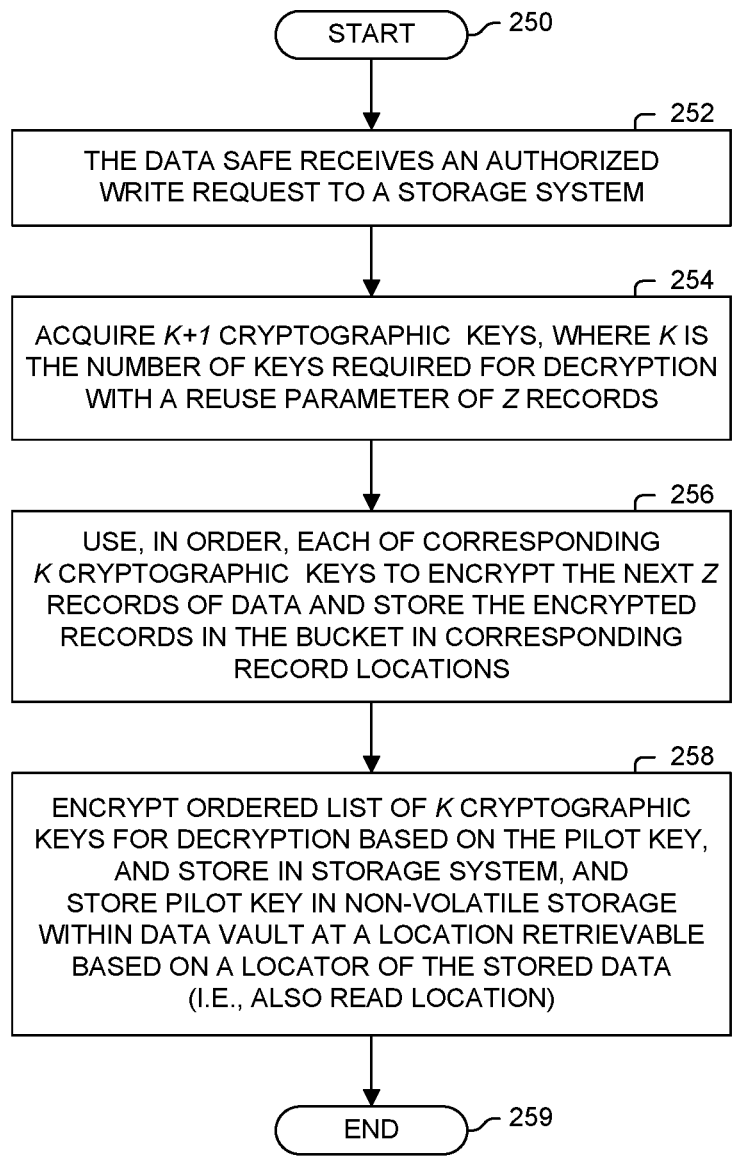
FIG. 2E illustrates a process according to one embodiment.

FIG. 2E illustrates a process performed by a data safe according to one embodiment. Processing begins with process block 250. In process block 252, the data safe receives an authorized write request. In one embodiment, the authorized write request includes data comprising feature-preserving encrypted data, natively or within a corresponding data structure instance. In process block 254, K+1 cryptographic keys are acquired, with K being a positive integer. These K+1 cryptographic keys include one pilot key and K data cryptographic keys, with Z records decryptable based on each of the K data cryptographic keys, with each of K and Z being a positive integer. In process block 256, each of K encryption keys are used in order to encrypt a corresponding Z records of data, with the encrypted data records stored in the storage system at the corresponding write positions. In process block 258, each of the K data cryptographic keys are encrypted so they can be decrypted based on the pilot key, with the K wrapped data cryptographic keys being stored in the in the data storage system (e.g., in bucket header(s), metadata, or elsewhere). The pilot key is stored in non-volatile storage in the data vault at a position retrieval based on a locator of the stored data in the storage system (which is also the location to be used as part of a read request). Processing of the flow diagram of FIG. 2E is complete as indicated by process block 259.

Figure 2F:
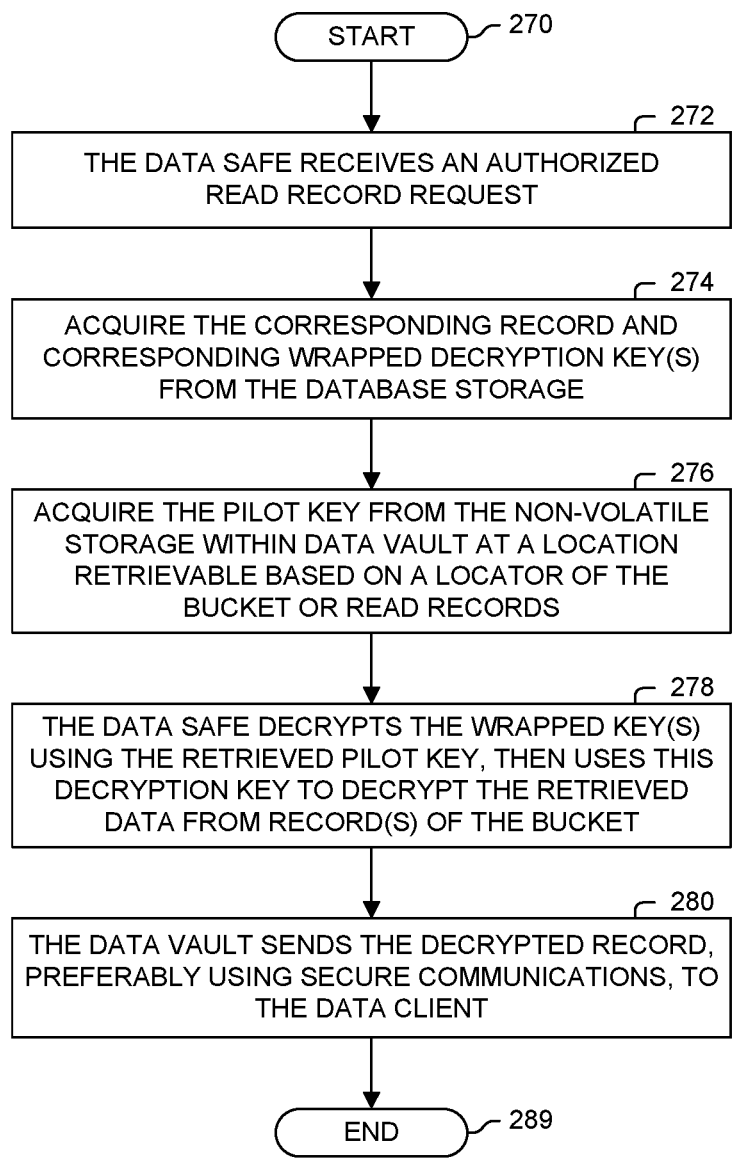
FIG. 2F illustrates a process according to one embodiment.

FIG. 2F illustrates a process performed according to one embodiment. Processing begins with process block 270. In process block 272, the data safe receives an authorized read record request. In process block 274, the corresponding encrypted record and wrapped data cryptographic key(s) are acquired. In process block 276, the pilot key is acquired from non-volatile storage within the data safe based on a locator of the stored data in the storage system (e.g., a locator of the bucket or records thereof). In process block 278, the data safe decrypts the data cryptographic key(s) based on the pilot key, then uses these data cryptographic key(s) to decrypt the retrieved data from record(s) of the bucket. In process block 280, the data safe communicates the decrypted data to a secure communications interface (e.g., Q-node interface) of the data vault containing the data safe, with the plaintext (e.g., decrypted) data corresponding to the read request being securely communicated to the data client. Processing of the flow diagram of FIG. 2F is complete as indicated by process block 289.

Figure 3A:
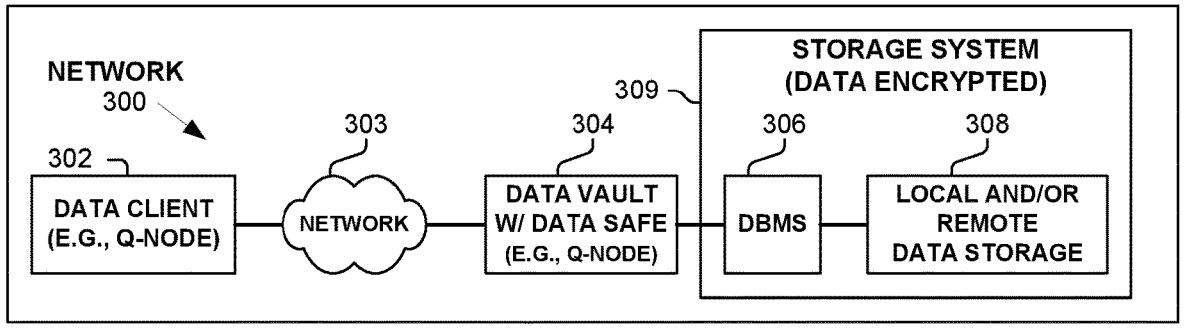
FIG. 3A illustrates a network operating according to one embodiment.
Figure 3B:
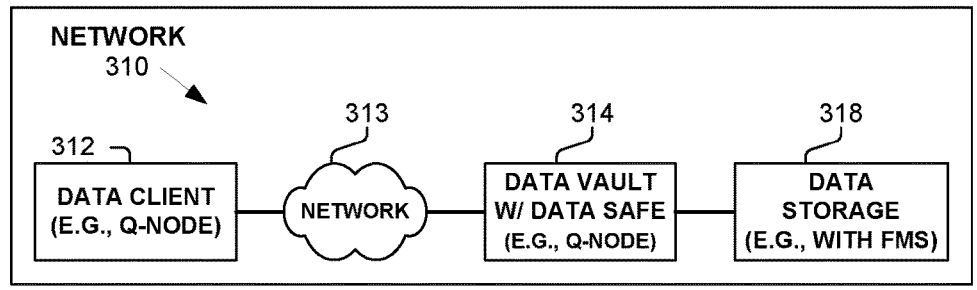
FIG. 3B illustrates a network operating according to one embodiment.
Figure 3C:
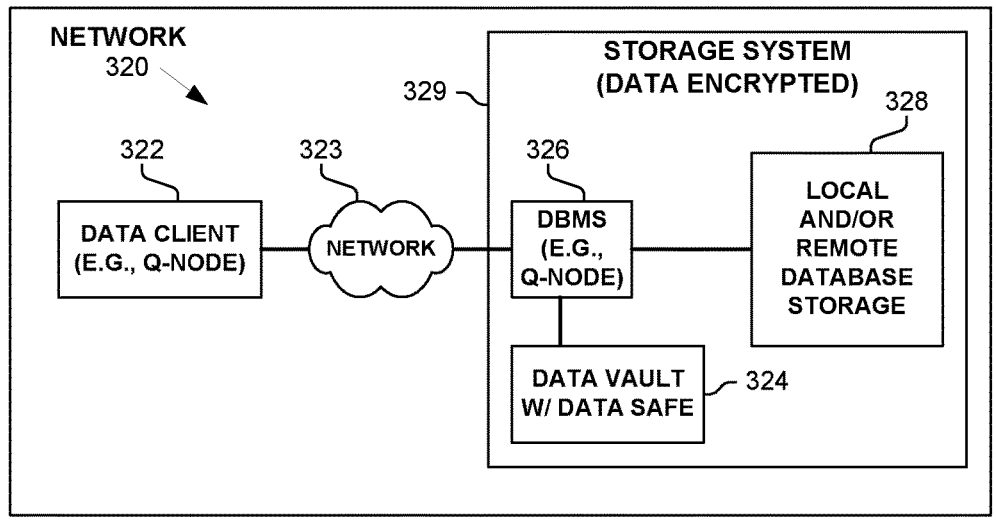
FIG. 3C illustrates a network operating according to one embodiment.

One embodiment modifies the processing described in the processing blocks of FIG. 2F. In processing block 272, the authorized read record request is received by the data safe from a DBMS (or other process) operating within the data vault. In one embodiment, the DBMS provides the read record request to the data safe in response to a feature-preserving encrypted read data request being received by the data vault from a data client. The data record acquired in processing block 274 includes feature-preserving encrypted data, natively or within a corresponding data structure instance, that was previously encrypted by the data safe using corresponding data cryptographic key(s). In processing block 278, the data safe the decryption of the retrieved data from record(s) of the bucket using corresponding data cryptographic key(s), thus revealing the feature-preserving encrypted data, natively or within a corresponding data structure instance. Process blocks 280-289 of FIG. 2F are replaced by processing blocks 659-689 of FIG. 6B Each of FIGS. 3A-C illustrate a network architecture according to one embodiment, such as, but not limited to, a same or different embodiment illustrated by FIG. 1A and discussed herein. The teachings described in relation to the processing performed in FIGS. 6A and 6B are applicable to the processing performed by various entities illustrated in FIGS. 3A-C in relation to data structure instances including feature-preserving encrypted data generated using feature-preserving encryption.

FIG. 3A illustrates a network 300 operating according to one embodiment. As shown, data client 302 interfaces storage system 309 (e.g., DBMS 306, local and/or remote data storage 308) through data vault 304 that includes a data safe. Data vault 304 protects storage system 309 (e.g., databases) from attacks launched over the network 303. The data safe encrypts all data/records for secure storage so that this data can be decrypted based on pilot keys (i.e., stored in non-volatile storage in the data safe); hence, providing further protection in case of a data breach (e.g., remotely acquiring data or physically acquiring storage). In one embodiment, each of data client 302 and data vault 304 is a Q-node, thus, data requests and responses (e.g., read and write requests and responses) transmitted between data client 302 and data vault 304 are encrypted with volatile keys to ensure record confidentiality and are provided with authentication tags to ensure record authenticity. In one embodiment shown in FIG. 3A, the interface between the DBMS 306 and storage 308 is affected to the extent that wrapped data cryptographic key(s) and encrypted data/records are stored (e.g., more storage space might be required).

In one embodiment, data vault 304 maintains (e.g., creating, modifying, deleting) and processes (e.g., performing queries thereon) data structure instances including feature-preserving encrypted data generated using feature-preserving encryption. The feature-preserving encrypted data, natively or within a corresponding data structure instance, is encrypted by the data safe and stored in storage system (306, 308). As required, this encrypted information is retrieved from storage system (306, 308), decrypted by the data safe, and processed.

FIG. 3B illustrates a network 310 operating according to one embodiment. As shown, data client 312 interfaces network-based storage 318 (e.g., NAS, cloud storage) through data vault 314 that includes a data safe. In one embodiment, data vault 314 is built into a network-based storage device (318). Data vault 314 protects data storage 318 from attacks launched over network 313. The data safe encrypts all data/records for secure storage so that this data can be decrypted based on pilot keys (i.e., stored in non-volatile storage in the data safe); hence, providing further protection in case of a data breach (e.g., remotely acquiring data or physically acquiring storage). In one embodiment, each of data client 312 and data vault 314 is a Q-node, thus, data requests and responses (e.g., read and write requests and responses) transmitted between data client 312 and data vault 314 are encrypted with volatile keys to ensure record confidentiality and are provided with authentication tags to ensure record authenticity. In one embodiment shown in FIG. 3B, the interface between the data client 312 and storage 318 is affected to the extent that wrapped data cryptographic key(s) and encrypted data/records are stored (e.g., more storage space might be required).

In one embodiment, data vault 314 using a DBMS (or other process) maintains (e.g., creating, modifying, deleting) and processes (e.g., performing queries thereon) data structure instances including feature-preserving encrypted data generated using feature-preserving encryption. The feature-preserving encrypted data, natively or within a corresponding data structure instance, is encrypted by the data safe and stored in data storage 318. As required, this encrypted information is retrieved from data storage 318, decrypted by the data safe, and processed.

FIG. 3C illustrates a network 320 operating according to one embodiment. As shown, data client 322 interfaces storage system 329 (e.g., DBMS 326, local and/or remote data storage 328) over network 323. In one embodiment, each of data client 322 and DBMS 326 is a Q-node, thus, data requests and responses (e.g., read and write requests and responses) transmitted between data client 322 and DBMS 326 are encrypted with volatile keys to ensure record confidentiality and are provided with authentication tags to ensure record authenticity. This protects storage system 329 (e.g., databases) from attacks launched over the network 323. Further, data vault 324 with data safe encrypts all data/records for secure storage so that this data can be decrypted based on pilot keys (i.e., stored in non-volatile storage in the data safe); hence, providing further protection in case of a data breach (e.g., remotely acquiring data or physically acquiring storage). In one embodiment shown in FIG. 3C, DBMS 326 communicates plaintext write data requests to data vault 324 and receives back encrypted information (e.g., data, wrapped data cryptographic key(s)) in write data responses that DBMS 326 then stores in storage 328. In one embodiment shown in FIG. 3C, DBMS 326 communicates encrypted information (e.g., data, data cryptographic key(s)) received in a read response from storage 328 to data vault 324 and receives back a decrypted version of the data read from storage 328. In this manner, DBMS 326 allocates space and manages storage of the encrypted data and any wrapped data cryptographic key(s). Further, DBMS 326 operates on plaintext, decrypted data, which may provide enhanced database searching capabilities.

In one embodiment, data vault 314 using a DBMS (or other process) maintains (e.g., creating, modifying, deleting) and processes (e.g., performing queries thereon) data structure instances including feature-preserving encrypted data generated using feature-preserving encryption. The feature-preserving encrypted data, natively or within a corresponding data structure instance, is encrypted by the data safe and stored in data storage 318. As required, this encrypted information is retrieved from data storage 318, decrypted by the data safe, and processed.

In one embodiment, DBMS 326 maintains (e.g., creating, modifying, deleting) and processes (e.g., performing queries thereon) data structure instances including feature-preserving encrypted data generated using feature-preserving encryption. The feature-preserving encrypted data, natively or within a corresponding data structure instance, is encrypted by the data safe in data vault 324 and stored in storage 328 via DBMS 326. As required, DBMS 326 retrieves from data storage 328 the data safe-encrypted information, which is decrypted by the data safe in data vault 324, with the revealed data structure instance including feature-preserving encrypted data being processed by DBMS 326.

Figure 3D:
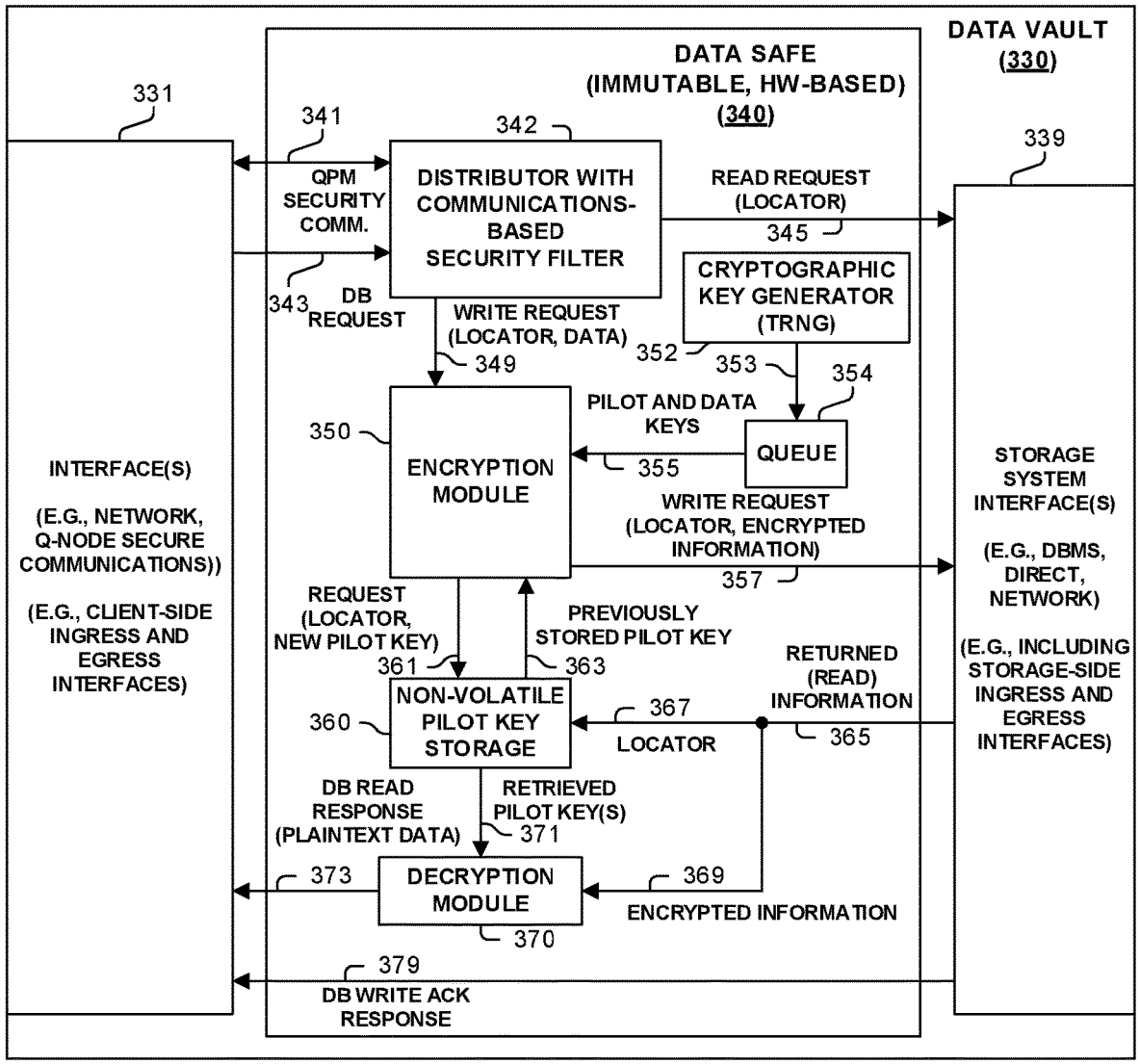
FIG. 3D illustrates an apparatus according to one embodiment.

FIG. 3D illustrates data vault 330 including data safe 340 according to one embodiment. Data vault 330 provides communications interfaces 331 and 339 for data safe 340. In one embodiment, data client interface(s) 331 provide secure communications to a data client (e.g., provide the Q-node functionality). In one embodiment, storage system interface(s) 339 provide communications to directly connected or networked storages systems.

The teachings described in relation to the processing performed in FIGS. 6A and 6B are applicable to the processing performed in relation to data structure instances including feature-preserving encrypted data generated using feature-preserving encryption. In one embodiment, a DBMS (or other process) within data vault 330 maintains (e.g., creating, modifying, deleting) and processes (e.g., performing queries thereon) data structure instances including feature-preserving encrypted data generated using feature-preserving encryption. The feature-preserving encrypted data, natively or within a corresponding data structure instance, is encrypted by data safe 340, with the resulting encrypted information communicated between one or more storage systems by data vault 330 in write information requests and read information responses. In one embodiment, data vault 330 communicates read data requests, read data responses, and write data requests with a data client. At least some of the read data requests include a feature-preserving encrypted data inquiry, with corresponding read data responses including a result of the performed feature-preserving encrypted data inquiry.

Data safe 340 is implemented in a manner to be immutable to data plane processing modifications. In one embodiment, data safe 340 is implemented in field-programmable gate array. In one embodiment, data safe 340 is implemented in one or more application-specific integrated circuits (ASICs). In one embodiment, data safe 340 is an ASIC core stored in non-transitory computer-readable medium for incorporation into storage, communication, and/or other devices. In one embodiment, data safe 340 is implemented in hardware that has no read-write instruction memory. In one embodiment, data safe 340 is implemented using a microprocessor (or other processing unit) with a fixed set of instructions (e.g., in storage that is not modifiable based on data plane processing by data safe 340). An implementation on a processor running on top of an operating system is not immutable as operating systems are prone to data plane processing modifications and other vulnerabilities. In one embodiment, an immutable data safe 340 is implemented in state-machine form with absolutely no stored program functionality.

As shown in FIG. 3D, a database request 343 (e.g., read or write request) is received by data safe 340 and provided to distributor 342 for distributing a read request 345 to storage system interface(s) 339 to acquire the desired data, and distributing a write request 349 to encryption module 350.

In one embodiment, a data safe 340 performs additional authorization processing such as, but not limited to, additional communications-based security filtering by distributor 342 as the database request must be authorized by a centralized authority node (e.g., via communications 341 and using interface(s) 331) that the data request is authorized based on an identification of a corresponding data client; otherwise the request is dropped. In one embodiment, this determination of whether a received request is authorized is further based on a type of said received request (i.e., is it a read request, write request, or other type of request) and data storage locator information associated with the request.

Distributor 342 communicates a valid/authorized write request 349 (e.g., includes data to be stored and where to store it) to encryption module 350. Cryptographic key generator 352 creates the cryptographic keys 353 used for encryption and decryption, such as, but not limited to, according to a version of the Advanced Encryption Standard (AES). For purposes of description of FIG. 3D, use of symmetric cryptographic keys (i.e., a same key is used for encryption and decryption of information) is discussed. However, asymmetric cryptographic keys are used in one embodiment of data safe 340.

In one embodiment, cryptographic key generator 352 uses a true random number generator (or other entropy generation mechanism) in creating the pilot and data cryptographic keys (353), which are provided to queue 354 for storage and for future immediate availability of keys 355 to encryption module 350. In one embodiment, the generated pilot and data cryptographic keys 353 are of a same length. In one embodiment, encryption module 350 modifies some or all of cryptographic keys 355 before using for encryption.

In one embodiment, encryption module 350 encrypts the data to be stored using one or more data cryptographic keys 355, and also encrypts the one or more data cryptographic keys 355 using one or more pilot keys 355 to generate wrapped data cryptographic key(s). In one embodiment, encryption module 350 encrypts the data to be stored using one or more pilot keys 353. Encryption module 350 also provides a pilot key storage request 361 that causes the used pilot key(s) (355) to be stored in non-volatile pilot key storage 360 at location(s) corresponding to storage locator information of the write request (349).

Encryption module 350 generates a corresponding write request 357 that includes the encrypted information (e.g., encrypted data, wrapped data cryptographic key(s)). In response, storage system interface 339 communicates a corresponding storage system write request provided to the storage system.

In one embodiment, prior to acquiring a pilot key 355 from queue 354, encryption module 350 performs a read operation on non-volatile pilot key storage 360 to see if a corresponding one or more pilot keys 363 have already been allocated for encrypting/decrypting the corresponding database record(s) (e.g., based on storage locator information of the write request (349)). If valid one or more pilot keys 363 are returned to encryption module 350, these pilot key(s) 363 are used instead of acquiring one or more new pilot keys (355). However, in one embodiment, if one or more pilot keys 363 are returned to encryption module 350, data safe 340 causes all data from the storage system which is decryptable based on these one or more pilot keys 363 to be read, and then rewrites with the data of the write request after encryption using one or more new pilot keys 355 (e.g., instead of reusing the previous pilot key(s) 363)

In one embodiment and in response to storage system interface(s) 339 receiving a write confirmed for the write request provided to the storage system, a database write acknowledgement response 379 is communicated to client interface(s) 331, which sends a write acknowledgement to the data client.

In one embodiment, distributor 342 communicates a valid/authorized read request 345 to acquire the desired data to storage system interface(s) 339, which communicates a corresponding data read request to the storage system. Reactive to the returned (read) information response 365, storage system interface(s) 339 provides the encrypted information 369 to decryption module 370, and provides locator information 367 to non-volatile pilot key storage 360 that causes corresponding one or more pilot keys 371 to be provided to decryption module 370. In one embodiment and such as for increasing an operating rate, read request (locator information) 345 is also provided to non-volatile pilot key storage 360 that causes corresponding one or more pilot keys 371 to be provided to decryption module 370 prior to receiving the returned (read) information 365.

Decryption module 370, based on pilot key(s) 371 decrypts encrypted information 369. In one embodiment, pilot key(s) 371 are used in decrypting one or more wrapped data cryptographic key(s), with the revealed data cryptographic key(s) used in decrypting the read encrypted data (369). In one embodiment, pilot key(s) 371 are used in decrypting the read encrypted data (369). Decryption module 370 provides a database read response (e.g., plaintext data) to interface(s) 331, which then, typically securely, communicates the read data to the data client.

In one embodiment, interface(s) 331 correlates received database requests (343) with data clients and database read responses 373 and database write responses 379 so that the appropriate data client can be sent a response. In one embodiment, client information and database request information accompanies the data plane processing of a database request, which is provided to interface(s) 331 along with the database response (373, 379) so that the appropriate data client can be sent a response.

Figure 3E:
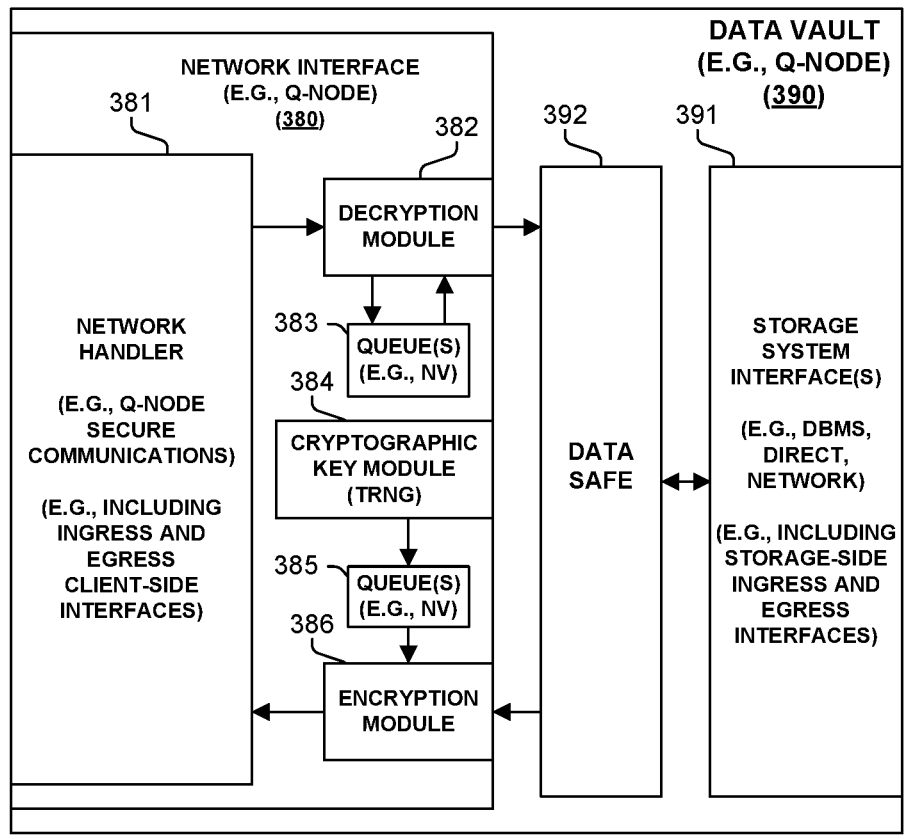
FIG. 3E illustrates an apparatus according to one embodiment.

FIG. 3E illustrates a Q-node data vault 390 including data safe 392 according to one embodiment. Data vault 390 provides communications interfaces 381 and 391 for data safe 392. In one embodiment, data client interface(s) 381 provide secure communications to a data client (i.e., provide the Q-node functionality). In one embodiment, storage system interface(s) 390 provide communications to directly connected or networked storages systems.

As shown, network interface 380 includes a network handler 381 (e.g., performing according to network protocols), decryption module 382, decryption key queues 383, cryptographic key generation module 384 (typically using a true random number generator), cryptographic key queues 385, and encryption module 386. One embodiment of the national intelligence-grade protection of the confidentiality and integrity of data in transit is provided by Q-net technology, including by Q-nodes disclosed in Cox, Jr. et al., U.S. Pat. No. 9,614,669 B1 issued Apr. 4, 2017, which is incorporated by reference in its entirety.

In one embodiment, cryptographic key queues 383, 385 are non-volatile so that secure data communication can be directly resumed from a power outage, from a low-power network interface 380 that only intermittently operates (e.g., for a low power Internet of Things device, to reduce bandwidth usages, etc.). In one embodiment, network interface 380 resumes communication by synchronizing with another network device (e.g., a centralized authority node (Q-node), client or server Q-node).

The teachings described in relation to the processing performed in FIGS. 6A and 6B are applicable to the processing performed in relation to data structure instances including feature-preserving encrypted data generated using feature-preserving encryption. In one embodiment, a DBMS (or other process) within data vault 390 maintains (e.g., creating, modifying, deleting) and processes (e.g., performing queries thereon) data structure instances including feature-preserving encrypted data generated using feature-preserving encryption. The feature-preserving encrypted data, natively or within a corresponding data structure instance, is encrypted by data safe 392, with the resulting encrypted information communicated between one or more storage systems via storage system interfaces 391 in write information requests and read information responses. In one embodiment, data vault 330 communicates, via network interface 380, read data requests, read data responses, and write data requests with a data client. At least some of the read data requests include a feature-preserving encrypted data inquiry, with corresponding read data responses including a result of the performed feature-preserving encrypted data inquiry.

Figure 3F:
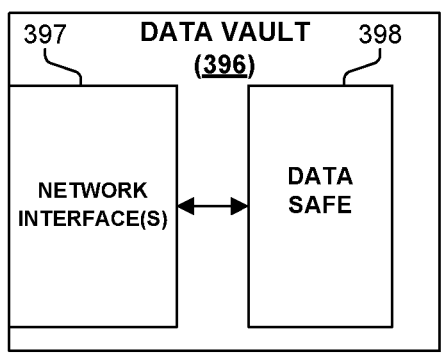
FIG. 3F illustrates an apparatus according to one embodiment.

FIG. 3F illustrates a data vault 396 including data safe 398 and network interface(s) 397 according to one embodiment. In one embodiment, interface(s) 397 provide (typically secure) communications to both data clients and storage systems.

The teachings described in relation to the processing performed in FIGS. 6A and 6B are applicable to the processing performed in relation to data structure instances including feature-preserving encrypted data generated using feature-preserving encryption. In one embodiment, a DBMS (or other process) within data vault 396 maintains (e.g., creating, modifying, deleting) and processes (e.g., performing queries thereon) data structure instances including feature-preserving encrypted data generated using feature-preserving encryption. The feature-preserving encrypted data, natively or within a corresponding data structure instance, is encrypted by data safe 398, with the resulting encrypted information communicated between one or more storage systems via network interface(s) 397 in write information requests and read information responses. In one embodiment, data vault 396 communicates, via network interface(s) 397, read data requests, read data responses, and write data requests with a data client. At least some of the read data requests include a feature-preserving encrypted data inquiry, with corresponding read data responses including a result of the performed feature-preserving encrypted data inquiry.

Figure 4A:
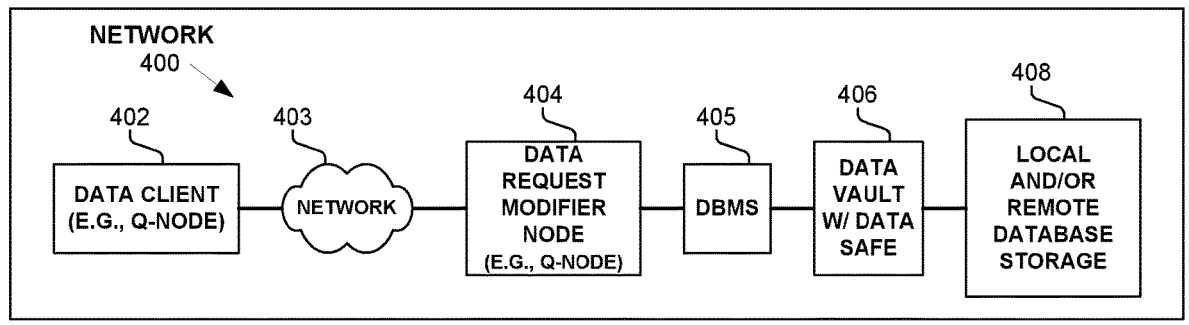
FIG. 4A illustrates a network operating according to one embodiment.

FIG. 4A illustrates a network 400 operating according to one embodiment. As shown, data client 402 (typically a Q-node) access DBMS 405 over network 403 and through a data request modifier node 404 (typically a Q-node). Also, DBMS 405 accesses local or remote storage 408 through data vault 406 with a data safe.

One embodiment maintains and processes data structure instances including feature-preserving encrypted data generated using feature-preserving encryption and further encryption and decryption by a data safe as described herein, including in relation to FIGS. 3A, 6A and 6B.

In one embodiment, data request modifier 404 securely communicates with data client 402. Data request modifier 404 modifies data requests from client 402 to DBMS 416 so that read and write requests generated by DBMS 416 accommodate the storage and retrieval of wrapped data cryptographic key(s) to and from storage 408. In one embodiment, the data safe of data vault 406 inserts these wrapped data cryptographic key(s) in a write information request from DBMS 405 to storage 408. In one embodiment, the data safe of data vault 406 removes these wrapped data cryptographic key(s) from a database read response from storage 408 to DBMS 405. In one embodiment, data request modifier 404 also modifies responses being sent to data client 402 from DBMS 405 to reflect the original database request (e.g., so not to expose to a data client any modification of a database request).

In addition, network 400 (including data vault 406 with data safe between DBMS 405 and storage 408) provides DBMS 405 plaintext versions of read and write requests so that many search actions can be carried out using the built-in search capabilities of DBMS 405.

Figure 4B:
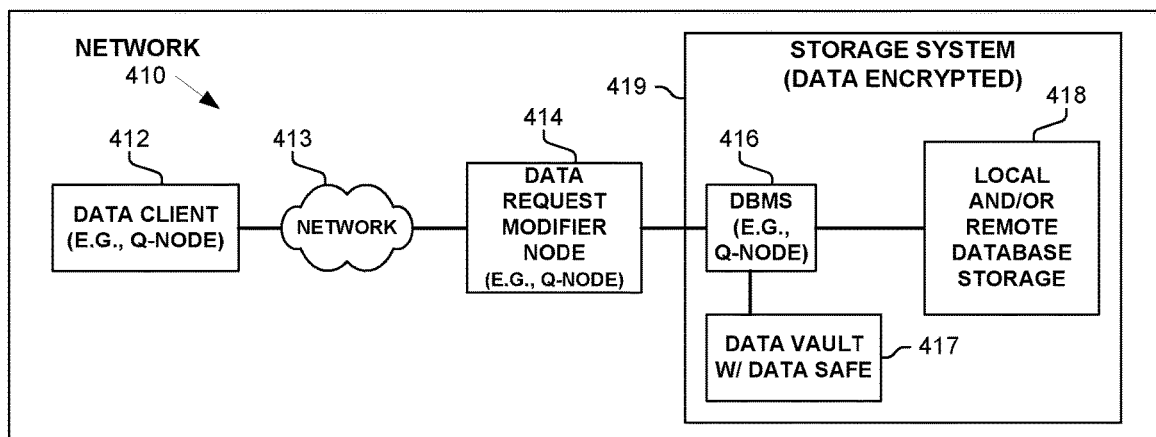
FIG. 4B illustrates a network operating according to one embodiment.

FIG. 4B illustrates a network 410 operating according to one embodiment. As shown, data client 412 access DBMS 416 over network 413 and through a data request modifier node 414 (typically a Q-node).

One embodiment maintains and processes data structure instances including feature-preserving encrypted data generated using feature-preserving encryption and further encryption and decryption by a data safe as described herein, including in relation to FIGS. 3C, 6A and 6B.

In one embodiment, data request modifier 414 operates as data request modifier 404 described in relation to FIG. 4A. In one embodiment, data vault 417 with data safe operates as data vault 324 of FIG. 3C. In one embodiment, data vault 417 with data safe of data vault 417 modifies database requests as described in relation to data safe of data vault 406 of FIG. 4A. As with one embodiment shown and described in relation to each of FIGS. 3C and 4A, the configuration of storage system 419 (with the data safe of data vault 417 being accessed by DBMS 416) provides DBMS 416 plaintext versions of read and write requests so that many search actions can be carried out using the built-in search capabilities of DBMS 416.

Figure 4C:
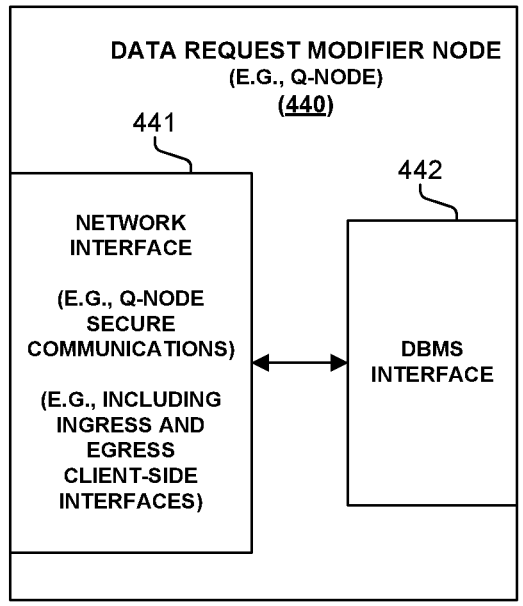
FIG. 4C illustrates an apparatus according to one embodiment.

FIG. 4C illustrates a data request modifier node 440 according to one embodiment. Network interface 441 provides communications with data clients, such as, but not limited to, that as described in relation to network interface 380 of FIG. 3E. Database interface 442 provides communication with a DBMS. In one embodiment, network interface 441 performs the modification of database requests and/or responses. In one embodiment, DBMS interface 442 performs the modification of database requests and/or responses.

Figure 4D:
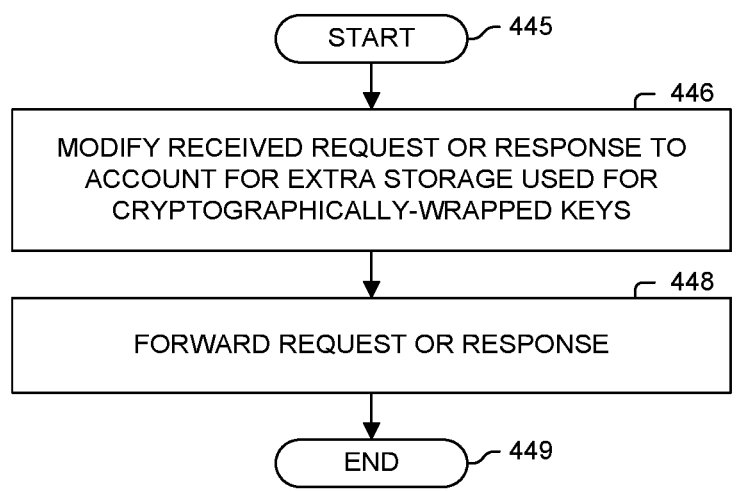
FIG. 4D illustrates a process according to one embodiment.

FIG. 4D illustrates a process according to one embodiment. Processing begins with process block 445. In process block 446, received database requests and/or responses are adjusted for the accommodation of extra storage space for storing wrapped data cryptographic key(s) in storage. In process block 448, the modified database request or response if forwarded accordingly. Processing of the flow diagram of FIG. 4D is complete as indicated by process block 449.

Figure 4E:
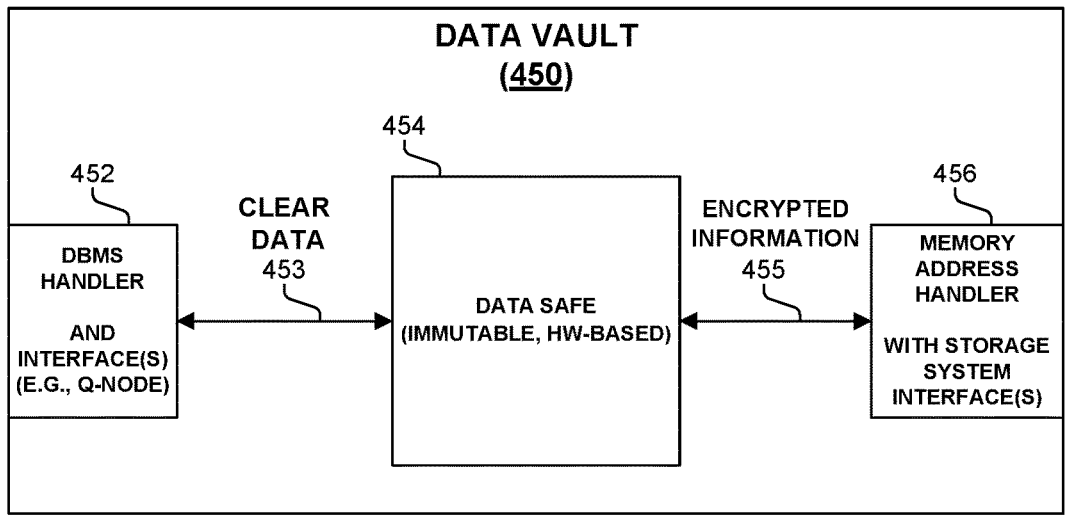
FIG. 4E illustrates an apparatus according to one embodiment.

FIG. 4E illustrates a data vault 450 including a data safe 454 according to one embodiment. Data vault 450 includes a DBMS handler and interface(s) 452 for communicating with one or more DBMS(s). Data vault 450 includes a memory address handler and interface(s) 456 for communicating with storage. As shown, data safe 454 exchanges plaintext data (453) with DBMS handler and interface(s) 452, and exchanges encrypted information (455) with memory address handler and interface(s) 456.

Figure 5:
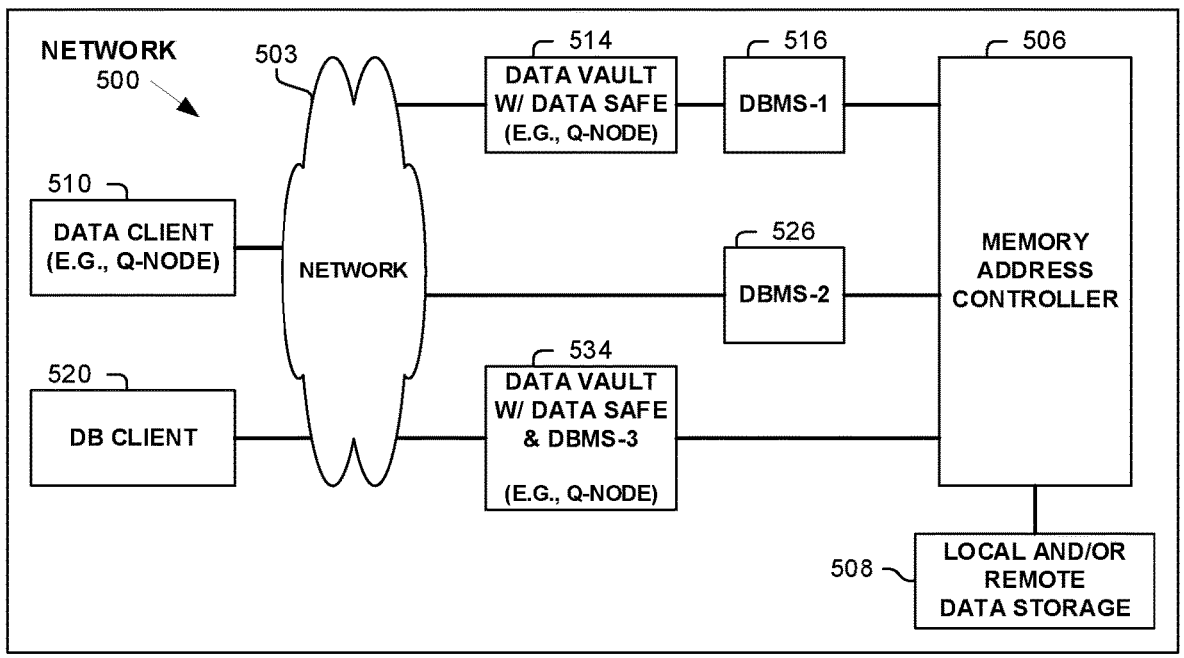
FIG. 5 illustrates a network operating according to one embodiment.

FIG. 5 illustrates a network 500 operating according to one embodiment. As shown, network 500 includes data client 510 (i.e., a Q-node), network 503, data vault 514 (i.e., a Q-node with a data safe), and DBMS-1 (516) communicatively coupled via memory address controller 506 to storage 508. In one embodiment, data client 510, network 503, data vault 514, DBMS-1 (516), and storage 508 operate such as that described in relation to network 300 of FIG. 3A. In one embodiment, data vault 514 maintains and processes data structure instances including feature-preserving encrypted data generated using feature-preserving encryption and further encryption and decryption by a data safe (514) as described herein, including in relation to FIGS. 3A, 3D, 3E, 6A, and 6B.

As shown, network 500 also includes data vault 534 (i.e., a Q-node with a data safe and DBMS-3) communicatively coupled via memory address controller 506 to storage 508. In one embodiment, data client 510, network 503, data vault 534, and storage 508 operate such as that described in relation to network 310 of FIG. 3B. In one embodiment, DBMS-3 in data vault 534 maintains and processes data structure instances including feature-preserving encrypted data generated using feature-preserving encryption and further encryption and decryption by a data safe (534) as described herein, including in relation to FIGS. 3A, 3D, 3E, 6A, and 6B.

As shown, network 500 includes an insecure data client 520 (e.g., is not a Q-node). Data client 520 communicates over network 503 with DBMS-2 (526), which is communicatively coupled via memory address controller 506 to storage 508.

As shown, memory address controller 506 provides access to storage 508 to each of DBMS-1 (516), DBMS-2 (526), and DBMS-3 in data vault 534.

Because each of DBMS-1 (516) and DBMS-3 (534) is separate from DBMS-2 (526), malware in DBMS-2 (526) cannot compromise DBMS-1 (516) nor DBMS-3 (534). In one embodiment, memory address controller 506 guarantees that no insecure records are stored in secure areas of data storage 508. Thus, malware arriving from a compromised client (e.g., data client 520) cannot reach secure areas of data storage 508, nor can such malware work its way back to a Q-node node 514, 534, 510. In one embodiment, this architectural separation technique is used in a network described in relation to FIGS. 1A, 3A, 3B, 3C, 4A and/or 4B.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. An apparatus, comprising:
a data safe performing data plane processing operations in response to requests of received read data requests, received write data requests, and received read information responses;
wherein the data safe is a single isolated hardware unit that is immutable to processing-related modifications resulting from said performing data plane processing operations;
wherein said performing data plane processing operations does not expose any of a plurality of pilot keys outside the data safe in plaintext form nor in encrypted form; and
wherein the data safe includes non-volatile storage that stores the plurality of pilot keys at retrievable positions based on data storage locator information associated with a storage system external to the data safe, and includes cryptographic circuitry;
wherein said cryptographic circuitry produces the plurality of pilot keys;
wherein said cryptographic circuitry, for each particular write data request of a plurality of said received write data requests, encrypts particular information resulting in encrypted particular information included in a particular write information request to the storage system, with said encrypted particular information being decryptable based on a particular pilot key of the plurality of pilot keys, and
wherein said cryptographic circuitry, for each specific read information response of a plurality of said received read information responses, decrypting specific encrypted information using a specific pilot key of the plurality of pilot keys resulting in said particular information, with said specific encrypted information having been received from the storage system in said specific read information response that corresponds a particular read data request of said received read data requests, and with the specific pilot key having been retrieved from said non-volatile storage based on data storage locator information corresponding to said specific read information response or the particular read data request;
wherein said particular information includes a data structure instance including feature-preserving encrypted data.

2. The apparatus of claim 1, comprising a data vault including the data safe, and one or more processing elements and memory; wherein the data vault provides to the data safe for encryption the data structure instance after generates the data structure instance including said feature-preserving encrypted data using feature-preserving encryption.

3. The apparatus of claim 2, wherein the data vault receives said data structure instance including said feature-preserving encrypted data from the data safe after decryption by said cryptographic circuitry.

4. The apparatus of claim 3, wherein the data vault performs a query on said data structure instance after receipt from the data safe resulting in a query result.

5. The apparatus of claim 4, wherein the query result is included in a corresponding database read data response sent to a data client.

6. The apparatus of claim 3, wherein the data vault generates plaintext data entries from said data structure instance including said feature-preserving encrypted data after receipt from the data safe, and then performs a query on said plaintext data entries resulting in a query response.

7. The apparatus of claim 6, wherein the data vault includes one or more network interfaces providing secure communication with the data client over a network, with said secure communications including decrypting ingress data included in ingress packets received by the apparatus resulting in said received read data requests and said received write data requests; and with said secure communications including encrypting the query response in an egress packet that is transmitted from the apparatus.

8. The apparatus of claim 7, wherein said decrypting ingress data and said encrypting the query response is performed by immutable hardware.

9. The apparatus of claim 2, wherein the data vault includes one or more network interfaces providing secure communication with the data client over a network, with said secure communications including decrypting ingress data included in ingress packets received by the apparatus resulting in said received read data requests and said received write data requests; and with said secure communications including encrypting the query response in an egress packet that is transmitted from the apparatus.

10. The apparatus of claim 1, wherein said cryptographic circuitry produces a plurality of data cryptographic keys;
wherein said particular information includes a particular data cryptographic key of the plurality of data cryptographic keys; and wherein said encrypted particular information includes encrypted particular data that is decryptable using said particular data cryptographic key, with said particular data acquired from said particular write data request; and
wherein said specific encrypted information includes a cryptographically-wrapped specific data cryptographic key and specific encrypted data; wherein said decrypting specific encrypted information includes decrypting the cryptographically-wrapped specific data cryptographic key using the specific pilot key resulting in a specific data cryptographic key of the plurality of data cryptographic keys and using the specific data cryptographic key in decrypting said specific encrypted data resulting in data of said specific data.

11. A method, comprising:
performing, by a data safe, data plane processing operations in response to requests of received read data requests, received write data requests, and received read information responses, with the data safe being implemented as a single isolated hardware unit that is immutable to processing-related modifications resulting from said performing data plane processing operations; wherein said performing data plane processing operations does not expose any of a plurality of pilot keys outside the data safe in plaintext form nor in encrypted form; and wherein said data plane processing operations include:
for each particular write data request of said received write data requests:
encrypting particular information resulting in encrypted particular information included in a particular write information request with said encrypted particular information being decryptable using a particular pilot key of the plurality of pilot keys generated within the data safe,
identifying a storage location in non-volatile storage within the data safe based on data storage locator information associated with said particular write data request,
storing the particular pilot key in the storage location in said non-volatile storage, and
sending the particular write information request to a storage system external to the data safe; and
for each specific read information response received in response to a particular read data request of said received read data requests:
reading a specific pilot key from said non-volatile storage from a location determined based on said specific read information response or the particular read data request;
decrypting encrypted specific information received in said specific read information response using the specific pilot key resulting in said particular information;
wherein said particular information includes a data structure instance including feature-preserving encrypted data.

12. The method of claim 11, wherein a data vault provides to the data safe for encryption the data structure instance after generating the data structure instance including said feature-preserving encrypted data using feature-preserving encryption.

13. The method of claim 12, wherein the data vault receives said data structure instance including said feature-preserving encrypted data from the data safe after decryption.

14. The method of claim 13, wherein the data vault performs a query on said data structure instance after receipt from the data safe resulting in a query result.

15. The method of claim 14, wherein the query result is included in a corresponding database read data response sent to a data client.

16. The method of claim 13, wherein the data vault generates plaintext data entries from said data structure instance including said feature-preserving encrypted data after receipt from the data safe, and then performs a query on said plaintext data entries resulting in a query response.

17. The method of claim 16, wherein the data vault includes one or more network interfaces providing secure communication with the data client over a network, with said secure communications including decrypting ingress data included in ingress packets received by the apparatus resulting in said received read data requests and said received write data requests; and with said secure communications including encrypting the query response in an egress packet that is transmitted from the apparatus.

18. The method of claim 17, wherein said decrypting ingress data and said encrypting the query response is performed by immutable hardware.

* * * * *